United States Patent
Mouri et al.

(10) Patent No.: US 12,306,441 B2
(45) Date of Patent: May 20, 2025

(54) FUSION SPLICER AND FUSION SPLICING METHOD

(71) Applicant: SUMITOMO ELECTRIC INDUSTRIES, LTD., Osaka (JP)

(72) Inventors: Shintaro Mouri, Osaka (JP); Soichi Endo, Osaka (JP); Akinori Kimura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 180 days.

(21) Appl. No.: 18/327,927

(22) Filed: Jun. 2, 2023

(65) Prior Publication Data
US 2023/0417994 A1 Dec. 28, 2023

(30) Foreign Application Priority Data
Jun. 28, 2022 (JP) ................. 2022-103524

(51) Int. Cl.
*G02B 6/255* (2006.01)
*G02B 6/02* (2006.01)
*G02B 6/12* (2006.01)

(52) U.S. Cl.
CPC ......... *G02B 6/2553* (2013.01); *G02B 6/2551* (2013.01); *G02B 6/02042* (2013.01); *G02B 2006/12192* (2013.01); *G02B 6/2555* (2013.01); *G02B 6/2556* (2013.01)

(58) Field of Classification Search
CPC .............. G02B 6/02042; G02B 6/2551; G02B 6/2553; G02B 6/2555; G02B 6/2556; G02B 2006/12192
See application file for complete search history.

(56) References Cited

U.S. PATENT DOCUMENTS

| | | | |
|---|---|---|---|
| 10,054,742 B2* | 8/2018 | Sato | G02B 6/2553 |
| 11,656,410 B2* | 5/2023 | Nakamura | G02B 6/2555 |
| | | | 385/96 |
| 11,762,148 B2* | 9/2023 | Zheng | B29D 11/00663 |
| | | | 385/97 |
| 11,960,120 B2* | 4/2024 | Ohzeki | G02B 6/02042 |
| 2015/0055923 A1 | 2/2015 | Saito et al. | |

FOREIGN PATENT DOCUMENTS

| | | |
|---|---|---|
| JP | 2013-050695 A | 3/2013 |
| JP | 2015-004762 A | 1/2015 |
| JP | 2017-021190 A | 1/2017 |

* cited by examiner

*Primary Examiner* — Ryan A Lepisto
(74) *Attorney, Agent, or Firm* — McDonald Hopkins LLC

(57) ABSTRACT

The fusion splicer includes a first holding unit, a second holding unit, a screen, a first measurement device, a first driving unit, a second driving unit, and a third driving unit. The screen has a light guide portion through which only test light emitted from one of the plurality of cores of the first optical fiber can pass. The screen is disposed between the end face of the first optical fiber and the end face of the second optical fiber. The first measurement device measures the intensity of leakage light leaking from the second optical fiber. The third driving unit adjusts the position of the screen such that the light guide portion is aligned with one of the plurality of cores of the first optical fiber in the axial direction of the first optical fiber.

17 Claims, 19 Drawing Sheets

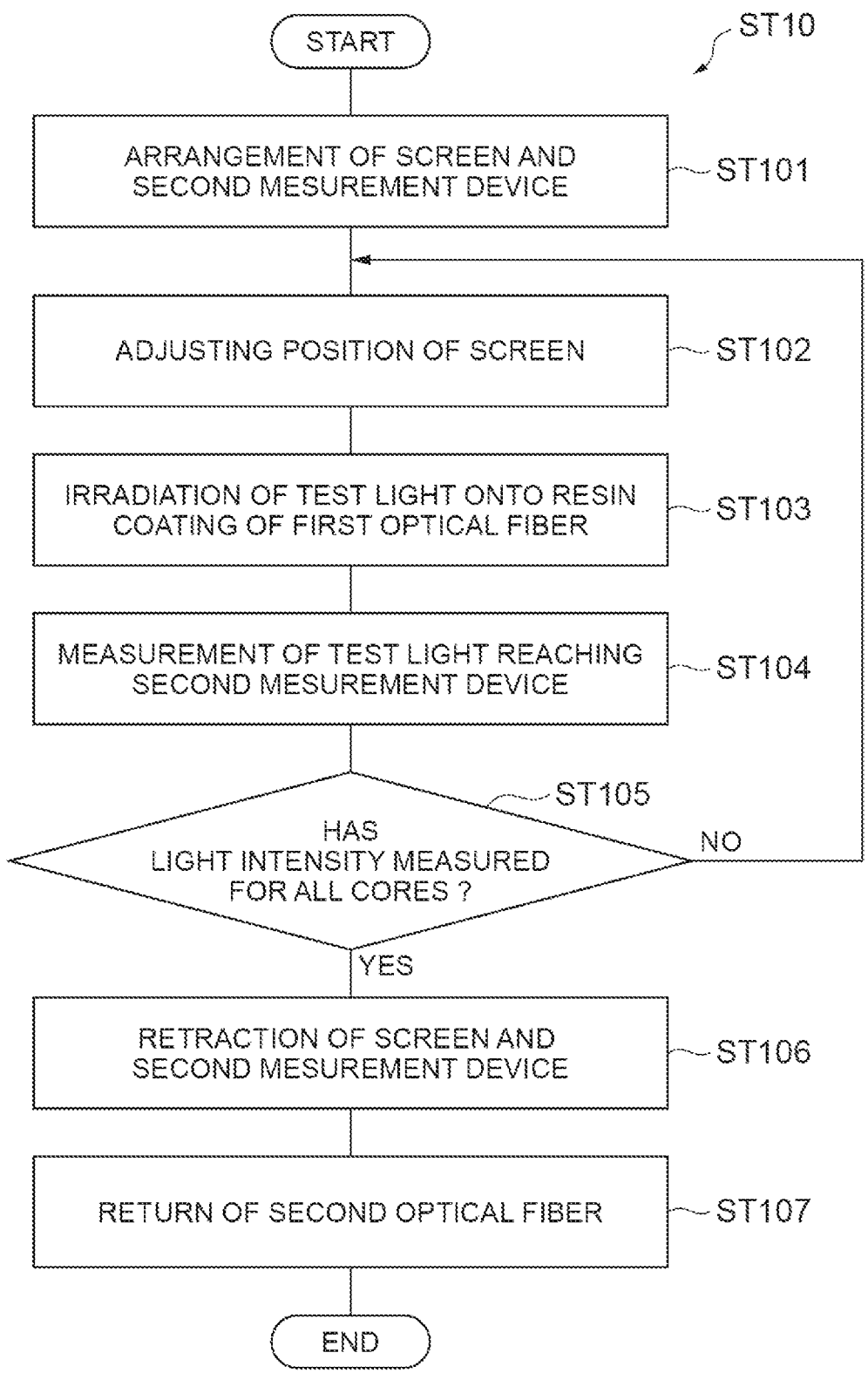

FUSION SPLICER AND FUSION SPLICING METHOD

CROSS-REFERENCE TO RELATED APPLICATION

This application is based upon and claims the benefit of the priority from Japanese Patent Application No. 2022-103524, filed on Jun. 28, 2022, the entire contents of which are incorporated herein by reference.

TECHNICAL FIELD

The present disclosure relates to an fusion splicer and fusion splicing method.

BACKGROUND

The following Patent Literatures 1 to 3 disclose methods for fusion-splicing two multicore optical fibers. The multi-core optical fibers include a plurality of cores and a cladding that covers the plurality of cores.

Patent Literature 1: Japanese Unexamined Patent Publication No. 2017-21190

Patent Literature 2: Japanese Unexamined Patent Publication No. 2015-4762

Patent Literature 3: Japanese Unexamined Patent Publication No. 2013-50695

SUMMARY

The present disclosure provides a fusion splicer that fusion-splices a first end face that is an end face of a first optical fiber having a plurality of cores with a second end face that is an end face of a second optical fiber having a plurality of cores. The fusion splicer comprises a first holding unit, a second holding unit, a screen, a light source, a first measurement device, discharge electrodes, a first driving unit, a second driving unit, and a third driving unit. The first holding unit holds the first optical fiber in a state where the first end face faces the second end face. The second holding unit holds the second optical fiber in a state where the second end face faces the first end face. The screen is disposed between the first end face and the second end face. The screen includes a light guide portion through which only light emitted from one of the plurality of cores of the first optical fiber can pass, and a light shielding portion that shields light that does not pass through the light guide portion. The light source causes test light to enter the first optical fiber. The first measurement device measures an intensity of leakage light leaking from the second optical fiber out of the test light emitted from the first end face and incident on the second end face. The discharge electrodes heat the first end face and the second end face. The first driving unit adjusts a position of the first holding unit and a first angle that is a rotation angle about an axis of the first optical fiber. The second driving unit adjusts a position of the second holding unit and a second angle that is a rotation angle about an axis of the second optical fiber. The third driving unit adjusts a position of the screen such that the light guide portion is aligned with one of the plurality of cores of the first optical fiber in an axial direction of the first optical fiber. The third driving unit retracts the screen from a position between the first end face and the second end face.

BRIEF DESCRIPTION OF THE DRAWINGS

FIG. 19 is a flowchart showing an operation when the fusion splicer measures the intensity of the test light emitted from each of the plurality of cores of the first optical fiber using the second measurement device.

DETAILED DESCRIPTION

Figure 1:
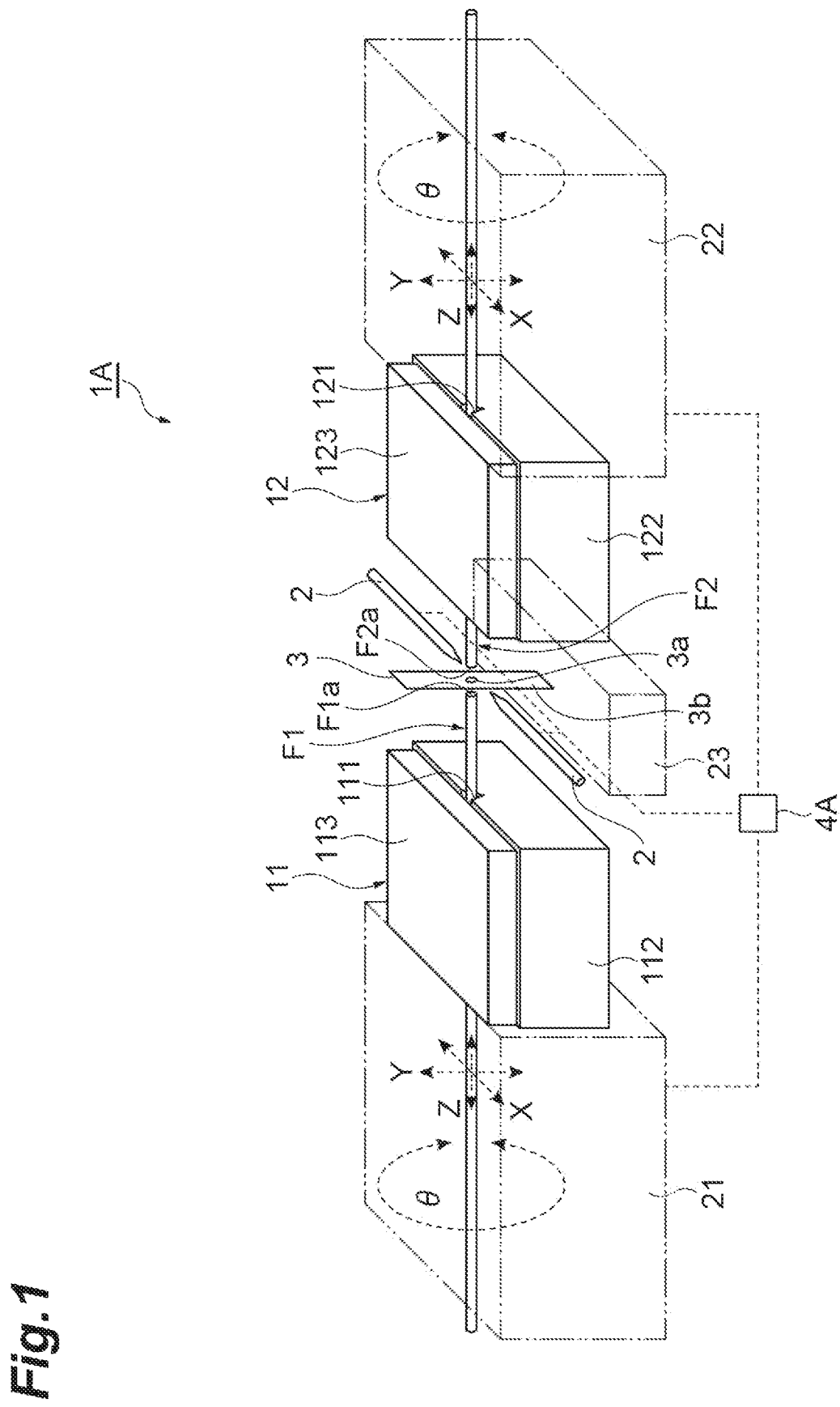
FIG. 1 is a diagram for explaining an outline of a fusion splicer according to a first embodiment.

Problems to be Solved by the Present Disclosure

Patent Literature 1 discloses a method for fusion-splicing a first multi-core optical fiber and a second multi-core optical fiber each having a plurality of cores and a cladding covering the plurality of cores. The method includes the following process. First, the end face of the first multi-core optical fiber and the end face of the second multi-core optical fiber are opposed to each other while the axis of the first multi-core optical fiber and the axis of the second multi-core optical fiber coincide with each other. Next, the test light is incident on the side surface of the first multicore optical fiber. The test light propagates through the cladding. Test light is detected from the second multicore optical fiber. Based on the intensity of the test light, optical fiber and the angle around the axis of the second multicore optical fiber are adjusted based on the intensity of the test light.

Patent Literature 2 discloses a method for fusion-splicing a first optical fiber and a second optical fiber that are multicore optical fibers. The method includes the following process. First, the end face of the first optical fiber and the end face of the second optical fiber are opposed to each other while the central axis of the first optical fiber and the central axis of the second optical fiber are parallel to each other. Next, a portion of the second optical fiber is bent. Next, light is caused to enter the core from one end portion of the first optical fiber or a side surface of the first optical fiber. The light emitted from the other end of the first optical fiber enters the second optical fiber. Next, the intensity of light leaking from the bent portion of the second optical fiber is measured. Next, at least one of the first optical fiber and the second optical fiber is moved or rotated so as to increase the intensity of light while maintaining the parallel state of the central axis of the first optical fiber and the central axis of the second optical fiber. Then, the other end portion of the first optical fiber and the end portion of the second optical fiber are fusion-spliced while maintaining the positional relationship between the first optical fiber and the second optical fiber when the intensity of light becomes maximum.

Patent Literature 3 discloses a method for fusion-splicing two multicore optical fibers to each other. Each multi-core optical fiber includes a plurality of cores, a marker spaced apart from the plurality of cores, and a cladding covering the plurality of cores and the marker. The two multicore optical fibers are arranged opposite to each other. A side surface of each of the two multicore optical fibers is irradiated with light. A monitor is disposed between the two multicore optical fibers. The monitor detects the profile of the light. Based on the position of the marker detected from the profile of light, the two multicore optical fibers are aligned.

However, in the methods described in Patent Literatures 1 to 3 for fusion-splicing two multicore optical fibers, since light propagates through all cores at the same time, it is not possible to confirm the guiding state of light of individual cores.

Effects of the Present Disclosure

According to the present disclosure, it is possible to provide a fusion splicer and a fusion splicing method capable of confirming the guiding state of light of individual cores.

DESCRIPTION OF EMBODIMENTS OF THE PRESENT DISCLOSURE

First, embodiments of the present disclosure will be listed and described.

[1] A fusion splicer according to one aspect of the present disclosure fusion-splices a first end face that is an end face of a first optical fiber having a plurality of cores with a second end face that is an end face of a second optical fiber having a plurality of cores. The fusion splicer comprises a first holding unit, a second holding unit, a screen, a light source, a first measurement device, discharge electrodes, a first driving unit, a second driving unit, and a third driving unit. The first holding unit holds the first optical fiber in a state where the first end face faces the second end face. The second holding unit holds the second optical fiber in a state where the second end face faces the first end face. The screen is disposed between the first end face and the second end face. The screen includes a light guide portion through which only light emitted from one of the plurality of cores of the first optical fiber can pass, and a light shielding portion that shields light that does not pass through the light guide portion. The light source causes test light to enter the first optical fiber. The first measurement device measures an intensity of leakage light leaking from the second optical fiber out of the test light emitted from the first end face and incident on the second end face. The discharge electrodes heat the first end face and the second end face. The first driving unit adjusts a position of the first holding unit and a first angle that is a rotation angle about an axis of the first optical fiber. The second driving unit adjusts a position of the second holding unit and a second angle that is a rotation angle about an axis of the second optical fiber. The third driving unit adjusts a position of the screen such that the light guide portion is aligned with one of the plurality of cores of the first optical fiber in an axial direction of the first optical fiber. The third driving unit retracts the screen from a position between the first end face and the second end face.

In this fusion splicer, only the test light emitted from any core of the first optical fiber passes through the screen by the light guide portion provided in the screen. Therefore, the first measurement device can measure the intensity of the test light emitted from any of the cores of the first optical fiber by measuring the intensity of the leakage light. Further, the third driving unit adjusts the position of the screen such that any of the plurality of cores of the first optical fiber is aligned with the light guide portion in the axial direction of the first optical fiber. Therefore, the first measurement device can measure the intensity of the test light emitted from each of the plurality of cores of the first optical fiber for each core by measuring the intensity of the leakage light. Accordingly, it is possible to confirm the light guiding state of each of the plurality of cores of the first optical fiber, the light guiding state of each of the plurality of cores of the second optical fiber, and the positional relationship between the plurality of cores of the first optical fiber and the plurality of cores of the second optical fiber. Therefore, the optical guiding state of the individual cores can be confirmed, and as a result, the first optical fiber and the second optical fiber can be fusion-spliced with low loss.

[2] In the fusion splicer according to [1], the first measurement device may measure a first intensity that is an intensity of the leakage light in a state where the third driving unit retracts the screen from the position between the first end face and the second end face and where the first driving unit and the second driving unit adjust the first angle and the second angle so that the leakage light measured by the first measurement device has a maximum intensity. The first measurement device may measure each of core intensities for each of the plurality of cores of the first optical fiber. Each of the core intensities may be an intensity of the leakage light in a state where a position of the screen is adjusted by the third driving unit such that the light guide portion is aligned with one of the plurality of cores of the first optical fiber in an axial direction of the first optical fiber. The first end face may be fusion-spliced with the second end face when a ratio of a second intensity, which is a sum of the core intensities corresponding to the plurality of cores of the first optical fiber, to the first intensity is within a predetermined first range. In that case, theoretically, the second intensity has a predetermined ratio to the first intensity. However, when the light guide portion is misaligned with each of the plurality of cores of the first optical fiber in the axial direction of the first optical fiber, the second intensity becomes smaller than the predetermined ratio with respect to the first intensity. Therefore, by checking the ratio of the second intensity to the first intensity, it is possible to confirm whether or not the position of the screen is disposed at an appropriate position.

[3] In the fusion splicer according to [1] or [2], the first measurement device may measure each of core intensities for each of the plurality of cores of the first optical fiber. Each of the core intensities may be an intensity of the leakage light in a state where a position of the screen is adjusted by the third driving unit such that the light guide portion is aligned with one of the plurality of cores of the first optical fiber in an axial direction of the first optical fiber. The first end face may be fusion-spliced with the second end face when a ratio of a minimum core intensity to a maximum core intensity among the core intensities corresponding to the plurality of cores of the first optical fiber is within a predetermined second range. When dust, a flaw, or the like is present in any core of the first optical fiber, the core intensity corresponding to the core is smaller than the core intensity corresponding to a core in which dust, a flaw, or the like is not present. According to the above configuration, by checking that the ratio of the minimum core intensity to the maximum core intensity is within the predetermined second range, it is possible to confirm that there is no dust, scratch, or the like in the core corresponding to the minimum core intensity. Therefore, the guiding state of light of each of the plurality of cores can be confirmed.

[4] In the fusion splicer according to any one of [1] to [3], the first measurement device may measure, for each of the plurality of cores of the first optical fiber, each of core intensities that is an intensity of the leakage light in a state where the position of the screen is adjusted by the third driving unit such that the light guide portion is aligned with one of the plurality of cores of the first optical fiber in an axial direction of the first optical fiber. The first measurement device may measure a third intensity that is an intensity of the leakage light in a state where the first end face is fusion-spliced with the second end face. The fusion splicer may further comprise a determination unit configured to determine a state of a fusion splicing between the first end face and the second end face. The determination unit may determine that the state of fusion splicing between the first end face and the second end face is abnormal when a ratio of the third intensity to a second intensity that is a sum of the core intensities corresponding to the plurality of cores of the first optical fiber is outside a predetermined third range. In that case, theoretically, the third intensity has a predetermined ratio to the second intensity. However, the ratio of the third intensity to the second intensity may become smaller than the predetermined ratio due to a positional deviation between the plurality of cores of the first optical fiber and the plurality of cores of the second optical fiber that occurs at the time of fusion. In the above configuration, when the ratio of the third intensity to the second intensity is out of the predetermined third range, it is determined that the state of the fusion splicing between the first end face and the second end face is abnormal. As a result, it is possible to detect the positional deviation between the plurality of cores of the first optical fiber and the plurality of cores of the second optical fiber that occurs at the time of fusion.

[5] In the fusion splicer according to any one of [1] to [4], each of the first optical fiber and the second optical fiber may further include a marker. The third driving unit may further adjust a position of the screen so that the light guide portion is aligned with the marker in the axial direction of the first optical fiber. By using the markers as a position reference of the first angle and the second angle, it is possible to prevent erroneous connection of the cores even when the core arrangement has rotational symmetry.

[6] In the fusion splicer according to any one of [1] to [5], the light guide portion may be a through hole. In that case, for example, compared to a case where the light guide portion is configured by a transparent flat plate, it is possible to suppress reflection of the test light by the light guide portion when the test light passes through the light guide portion. Therefore, it is possible to prevent the test light from returning to the light source and affecting the operation of the light source.

[7] In the fusion splicer according to any one of [1] to [5], the light guide portion may be a condenser lens. In that case, the test light emitted from the first end face is condensed toward the second end face by the condenser lens. Therefore, it is possible to suppress leakage of the test light during a period from when the test light is emitted from the first end face to when the test light is incident on the second end face. Therefore, the amount of test light incident on the second end face can be increased, and the amount of leakage light can be increased. As a result, it is possible to improve accuracy when the first measurement device measures the intensity of the leakage light.

[8] In the fusion splicer according to any one of [1] to [7], the light shielding portion of the screen may have a non-reflective coating. In that case, it is possible to suppress the test light from being reflected by the screen. Therefore, it is possible to prevent the test light from returning to the light source and affecting the operation of the light source.

[9] The fusion splicer according to any one of [1] to [8] may further comprise a second measurement device. The second measurement device may be configured to be movable between a first position sandwiching the screen between the first end face and a second position away from the first position and to measure an intensity of the test light emitted from the first end face through the light guide portion of the screen. The second measurement device may measure the intensity of the test light emitted from each of the plurality of cores of the first optical fiber through the light guide portion at the first position in a state where the second driving unit retracts the second optical fiber and the third driving unit adjusts a position of the screen so that the light guide portion is aligned with one of the plurality of cores of the first optical fiber in the axial direction of the first optical fiber. After that measurement, the second measurement device may move to the second position and the second driving unit may return the second optical fiber to a position facing the first optical fiber. In that case, the second measurement device directly measures the intensity of the test light emitted from each of the plurality of cores of the first optical fiber for each core. Therefore, it is possible to more accurately confirm the light guiding state of the plurality of cores of the first optical fiber.

[10] A fusion splicing method according to one aspect of the present disclosure is a method for fusion-splicing a first end face that is an end face of a first optical fiber having a plurality of cores with a second end face that is an end face of a second optical fiber having a plurality of cores. The fusion splicing method comprising: causing the first end face and the second end face to face each other; aligning a central axis of the first optical fiber and a central axis of the second optical fiber with each other; adjusting a first angle that is a rotation angle about the central axis of the first optical fiber and a second angle that is a rotation angle about the central axis of the second optical fiber; incidence of test light into the first optical fiber; performing, for each of the plurality of cores of the first optical fiber, measuring an intensity of leakage light leaking from the second optical fiber in a state where the test light other than the test light emitted from one core of the plurality of cores of the first optical fiber among the test light emitted from the first end face is shielded; and determining whether to fusion-splice the first end face with the second end face based on the intensity of the leakage light corresponding to each of the plurality of cores of the first optical fiber.

In this fusion splicing method, the measuring the intensity of leakage light leaking from the second optical fiber is performed for each of the plurality of cores of the first optical fiber in a state in which test light other than the test light emitted from any core of the first optical fiber is shielded. Therefore, the intensity of the leakage light corresponding to each of the plurality of cores of the first optical fiber can be measured for each core. It is determined whether to fusion-splice the first end face and the second end face based on the intensity of leakage light corresponding to each of the plurality of cores of the first optical fiber. Therefore, it is possible to prevent the first end face and the second end face from being fusion-spliced to each other in a state where the guiding state of light of the plurality of cores is not favorable.

Details of Embodiments of the Present Disclosure

Specific examples of an embodiment of the present disclosure will be described below with reference to the drawings. The present invention is not limited to the examples, but is indicated by the appended claims and is intended to include all modifications within the meaning and scope equivalent to the appended claims. In the following description, the same elements will be designated by the same reference numerals in the description of the drawings, and redundant description will be omitted.

First Embodiment

Figure 2:
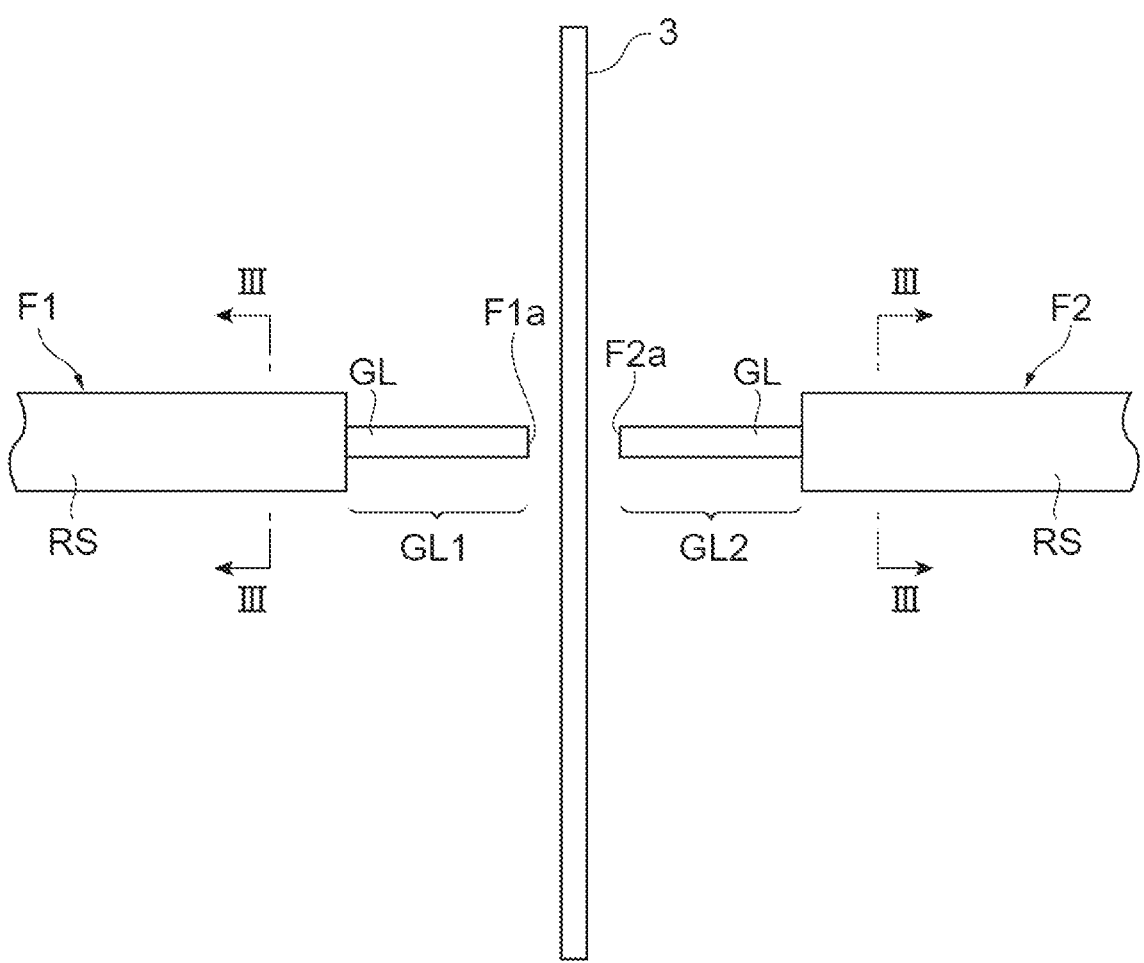
FIG. 2 is a side view of a first optical fiber and a second optical fiber.
Figure 3:
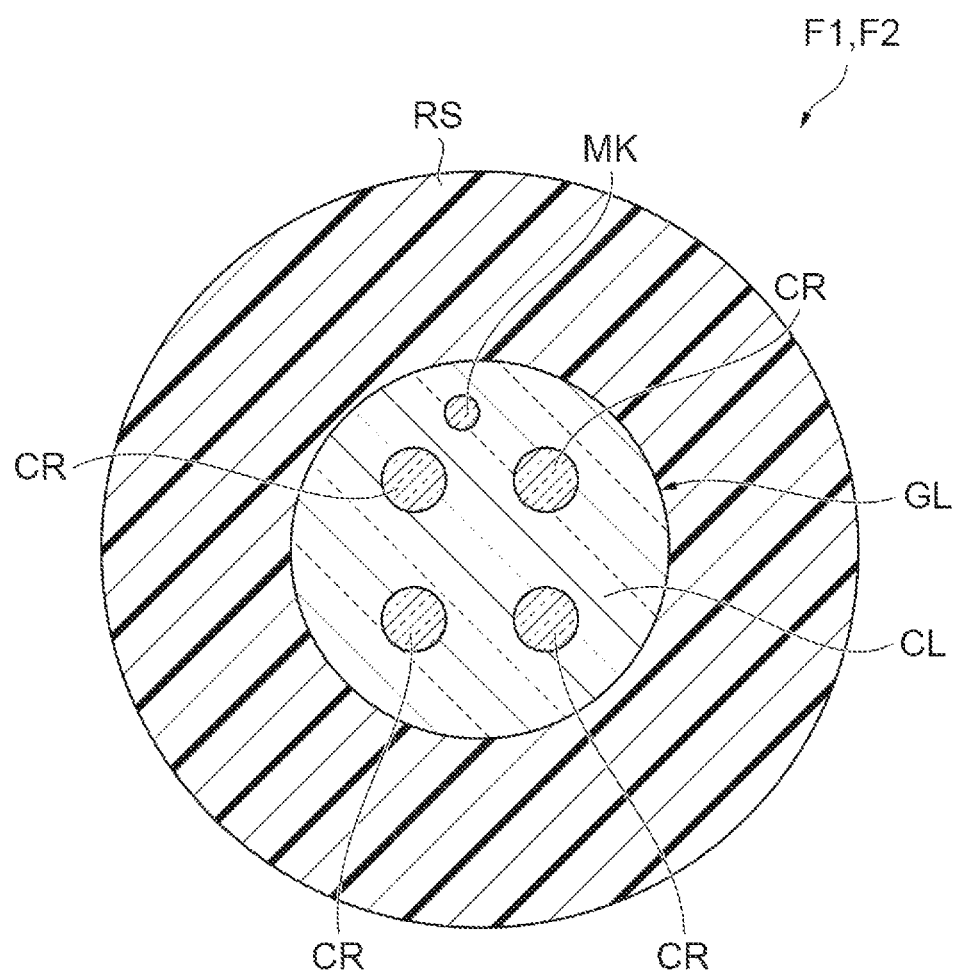
FIG. 3 is a cross-sectional view of the first optical fiber and the second optical fiber taken along section III-III shown in FIG. 2.

FIG. 1 is a diagram for explaining an outline of a fusion splicer 1A according to a first embodiment. FIG. 1 also shows an XYZ orthogonal coordinate system. As shown in FIG. 1, the fusion splicer 1A fusion-splices the end face F1a of the first optical fiber F1 and the end face F2a of the second optical fiber F2 to each other. FIG. 2 is a side view of the first optical fiber F1 and the second optical fiber F2. FIG. 3 is a cross-sectional view of the first optical fiber F1 and the second optical fiber F2 taken along section III-III shown in FIG. 2. As shown in FIG. 3, each of the first optical fiber F1 and the second optical fiber F2 includes a glass portion GL and a resinous coating RS surrounding the outer periphery of the glass portion GL. The glass portion GL includes one or more (four in the illustrated example) cores CR, one marker MK, and a common cladding CL surrounding the cores CR and the marker MK. The marker MK is transparent. The marker MK may be opaque. The marker MK has a refractive index distribution capable of transmitting light.

As shown in FIG. 2, in the first optical fiber F1, the end face F1a of the glass portion GL including the end portion GL1 is exposed from the resinous coating RS. In the second optical fiber F2, the end face F2a of the glass portion GL including the end portion GL2 is exposed from the resinous coating RS. These exposed portions are formed by removing the resinous coating RS around the distal end portions GL1 and GL2 before the fusion splicing operation.

Reference is again made to FIG. 1. The fusion splicer 1A includes a first holding unit 11 and a second holding unit 12. The first holding unit 11 holds the first optical fiber F1 in a state where the end face F1a faces the end face F2a. While holding the first optical fiber F1, the first holding unit 11 makes the position of the end face F1a of the first optical fiber F1 and the rotation angle θ (first angle) around the central axial line variable. The position of the end face means a position of the end face in each of the X axis, the Y axis, and the Z axis. The second holding unit 12 holds the second optical fiber F1a in a state where the end face F2a faces the end face F2. The second holding unit 12 holds the second optical fiber F2 and changes the position of the end face F2a of the second optical fiber F2 and the rotation angle θ (second angle) around the central axial line. The first holding unit 11 and the second holding unit 12 are arranged along the Z-axis direction which is the central axis direction of the first optical fiber F1 and the second optical fiber F2. The first holding unit 11 has a V-groove 111 extending along the Z-axis direction. The V-groove 111 accommodates a portion of the first optical fiber F1 excluding the end portion GL1, that is, a portion having the resinous coating RS, and fixes the position of the first optical fiber F1 in the XY plane. The first holding unit 11 holds the first optical fiber F1 in a state where the end portion GL1 is protruded. The second holding unit 12 has a V-groove 121 extending along the Z-axis direction. The V-groove 121 accommodates a portion of the second optical fiber F2 excluding the end portion GL2, that is, a portion having the resinous coating RS, and fixes the position of the second optical fiber F2 in the XY plane. The second holding unit 12 holds the second optical fiber F2 in a state where the end portion GL2 is protruded.

In one embodiment, the first holding unit 11 and the second holding unit 12 are made of resin. The first holding unit 11 includes, for example, a table 112 in which a V-groove 111 is formed and on which the first optical fiber F1 is placed, and a lid 113 placed on the table 112. The table 112 and the lid 113 are arranged, for example, along the Y-axis direction intersecting the Z-axis direction. The second holding unit 12 includes, for example, a table 122 on which a V-groove 121 is formed and on which the second optical fiber F2 is placed, and a lid 123 placed on the table 122. The table 122 and the lid 123 are disposed so as to be aligned along the Y-axis direction, for example.

The fusion splicer 1A further includes a first driving unit 21 and a second driving unit 22. The first driving unit 21 supports the first holding unit 11 and adjusts the position of the first holding unit 11 and the rotation angle θ of the first holding unit 11 about the Z axis. The position of the end face F1a and the rotation angle θ are adjusted by the first driving unit 21 adjusting the position and the rotation angle θ of the first holding unit 11. The second driving unit 22 supports the second holding unit 12 and adjusts the position of the second holding unit 12 and the rotation angle θ of the second holding unit 12 about the Z axis. The position of the end face F2a and the rotation angle θ are adjusted by the second driving unit 22 adjusting the position and the rotation angle θ of the second holding unit 12. The first driving unit 21 and the second driving unit 22 include, for example, motors.

The fusion splicer 1A further comprises a screen 3. The screen 3 allows only light emitted from one core CR among light emitted from the end face F1a of the first optical fiber F1 to pass therethrough and shields light emitted from the other cores CR. The screen 3 has a rectangular shape. The screen 3 is disposed between the end face F1a and the end face F2a. The screen 3 can be retracted to a position other than the position between the end face F1a and the end face F2a. The screen 3 is thinner than the distance between the end face F1a and the end face F2a. The screen 3 extends along a plane perpendicular to the Z-axis direction. The position of the screen 3 is variable. Specifically, the position of the screen 3 is variable in the X direction and the Y direction. The rotation angle of the screen 3 around the Z axis may be variable.

Figure 4:
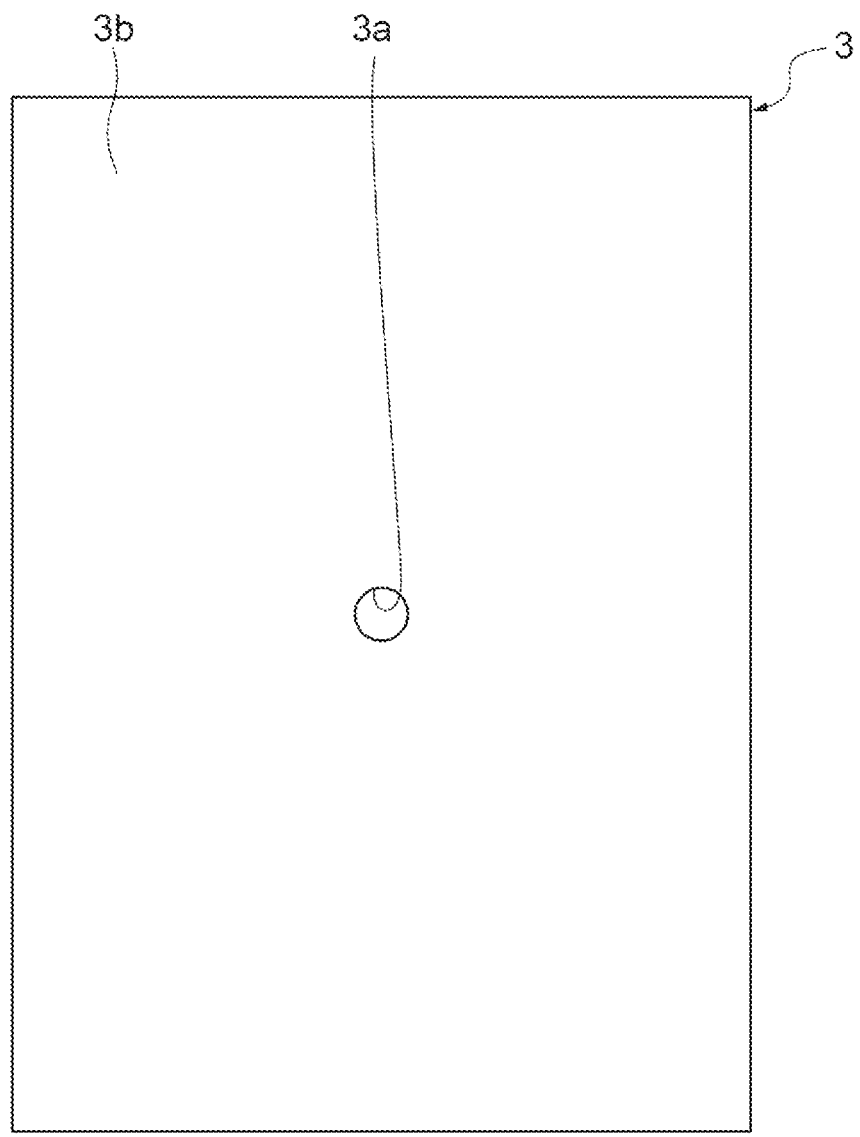
FIG. 4 is a front view of a screen.
Figure 5:
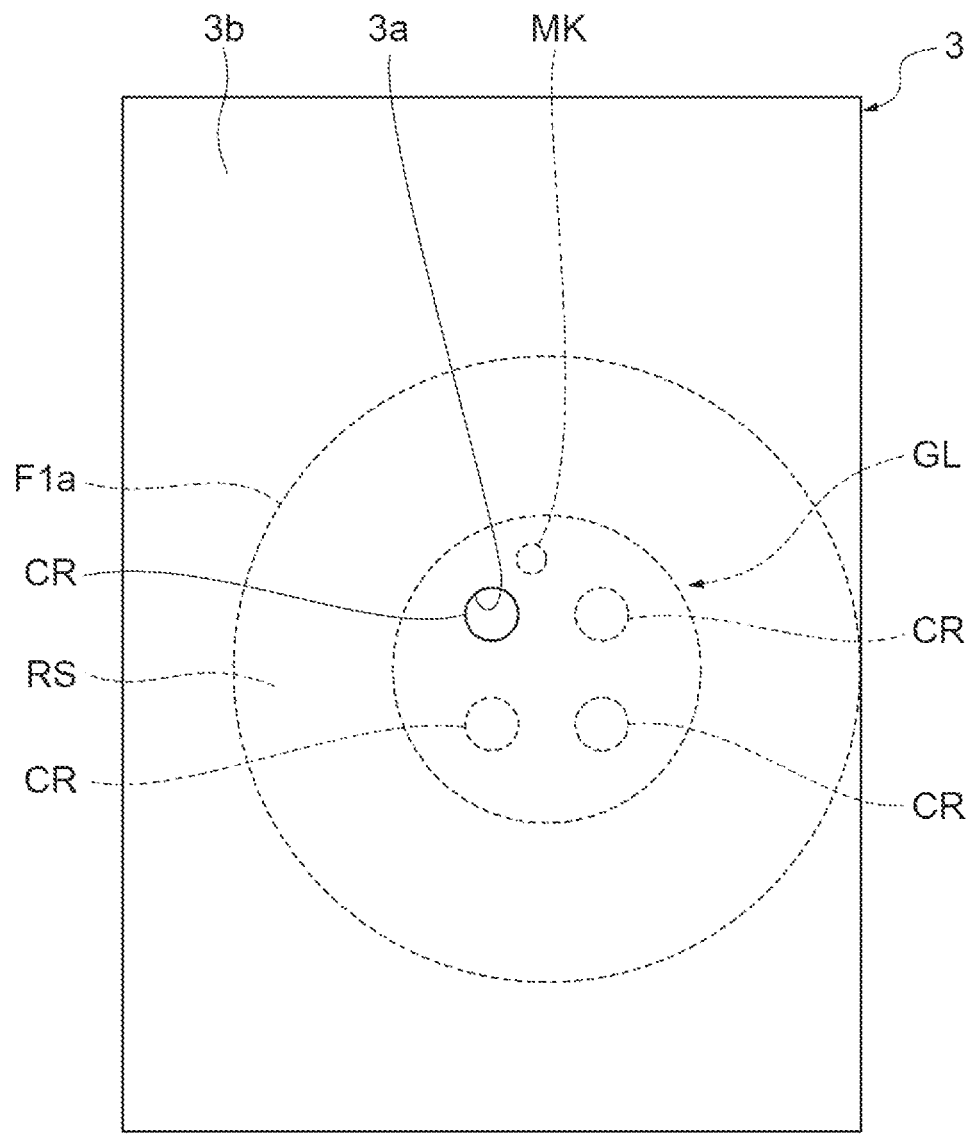
FIG. 5 is a diagram illustrating a state in which the light guide portion is aligned with any of the plurality of cores of the first optical fiber in the axial direction of the first optical fiber.
Figure 6:
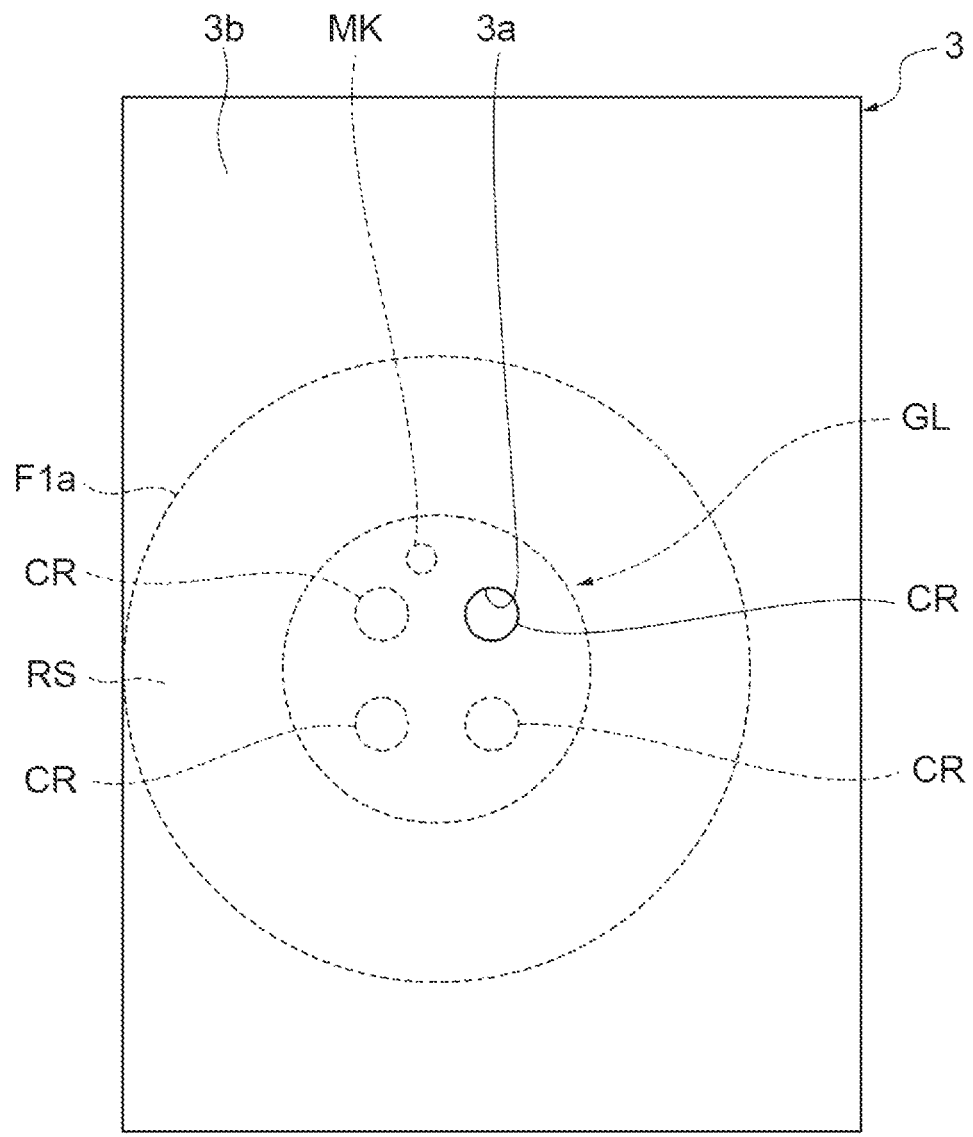
FIG. 6 is a diagram illustrating a state in which the light guide portion is aligned with any of the plurality of cores of the first optical fiber in the axial direction of the first optical fiber.
Figure 7:
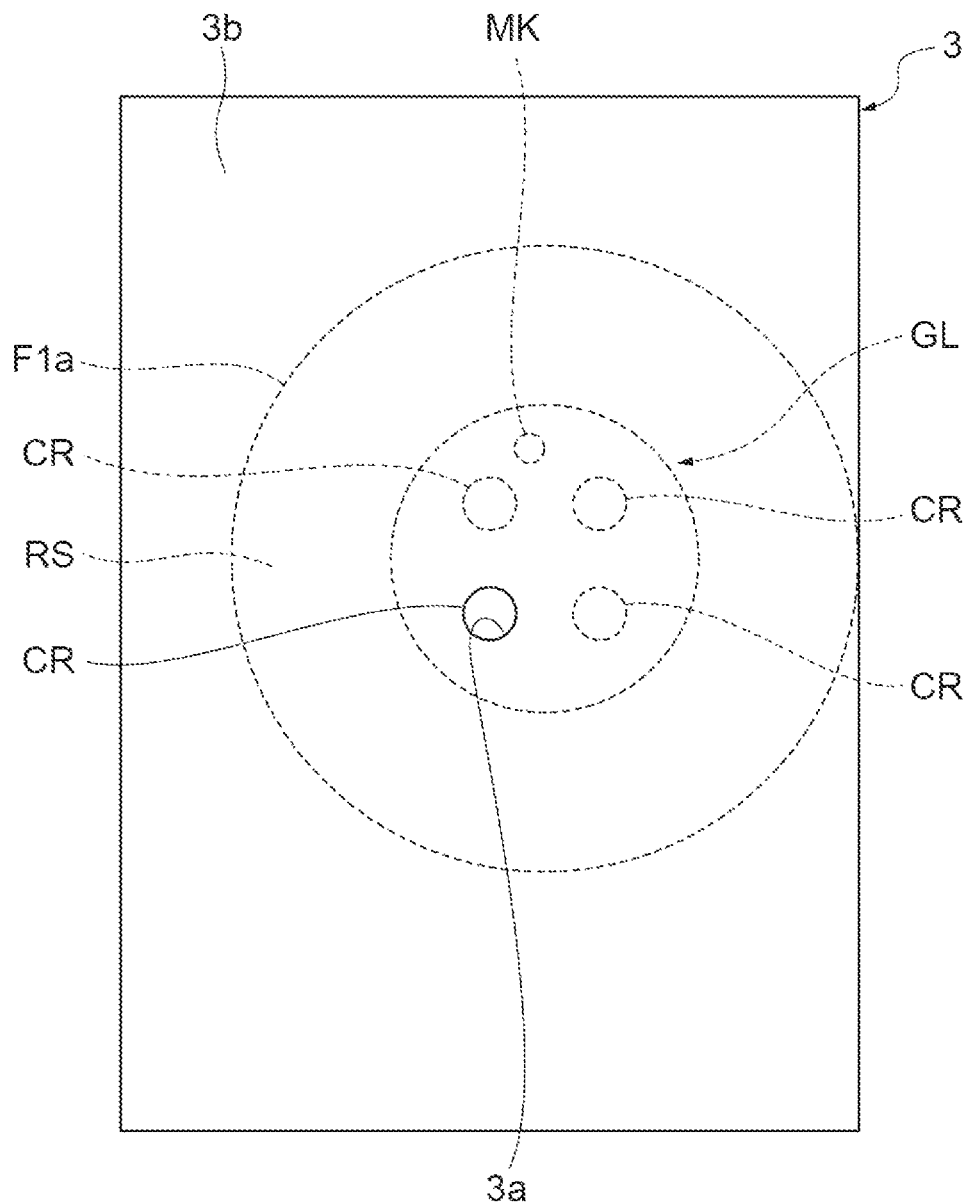
FIG. 7 is a diagram illustrating a state in which the light guide portion is aligned with any of the plurality of cores of the first optical fiber in the axial direction of the first optical fiber.
Figure 8:
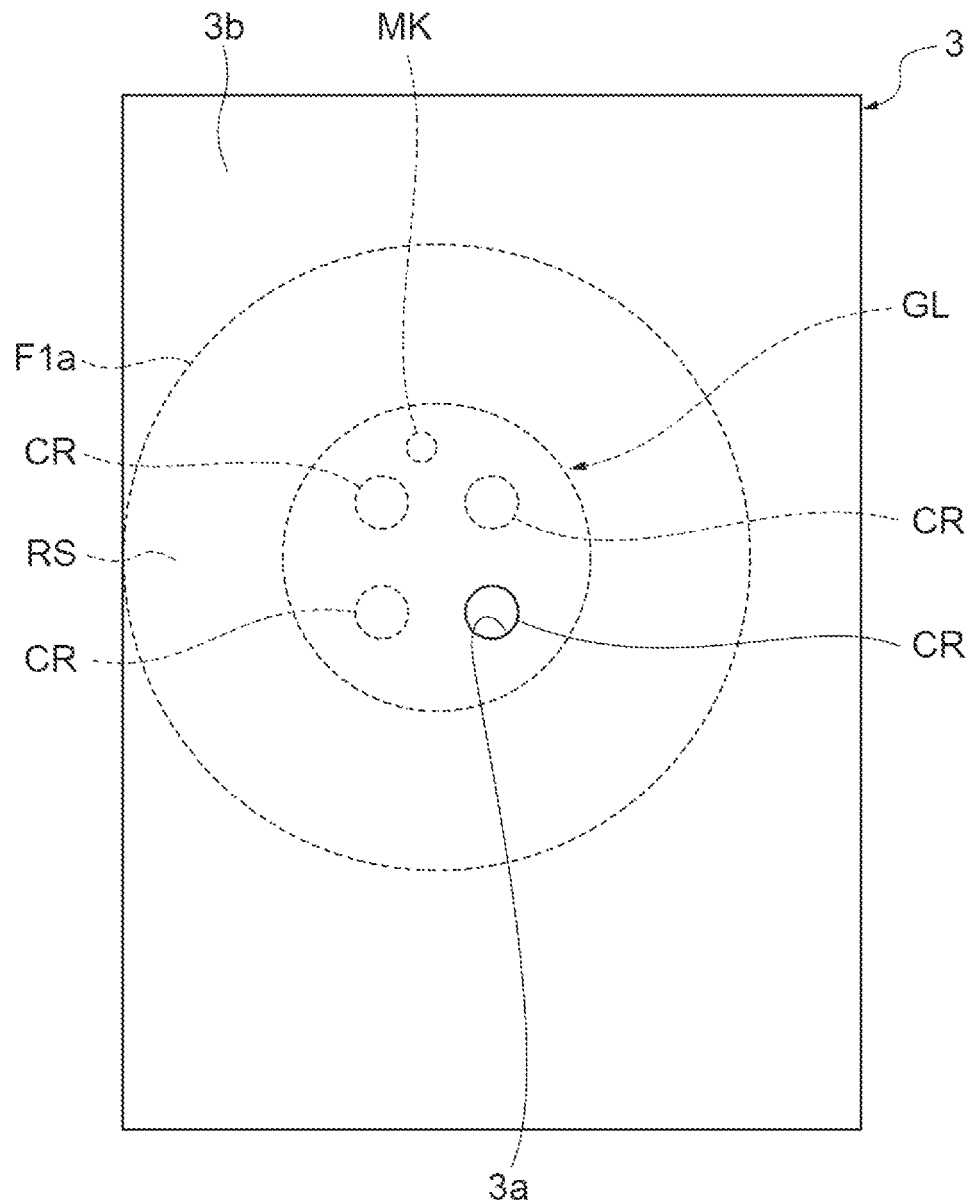
FIG. 8 is a diagram illustrating a state in which the light guide portion is aligned with any of the plurality of cores of the first optical fiber in the axial direction of the first optical fiber.

FIG. 4 is a front view of the screen 3. As shown in FIG. 4, the screen 3 includes a light guide portion 3a and a light shielding portion 3b. The light guide portion 3a is a through hole that penetrates the screen 3 in the Z-axis direction. The light guide portion 3a has a circular shape when viewed from the Z-axis direction. The diameter of the light guide portion 3a are slightly larger than the respective diameters of the plurality of cores CR of the first optical fiber F1. The diameters of the light guide portion 3a are larger than that of the marker MK of the first optical fiber F1. Only light emitted from one core CR can pass through the light guide portion 3a. The light shielding portion 3b is made of a material that shields light. Among the light emitted from the plurality of cores CR of the first optical fiber F1, light that does not pass through the light guide portion 3a is shielded by the light shielding portion 3b. The light shielding portion 3b has a non-reflective coating.

The screen 3 may have any configuration as long as it can shield light other than light emitted from one core CR among the plurality of cores CR of the first optical fiber F1.

The fusion splicer 1A further includes a third driving unit 23. The third driving unit 23 supports the screen 3 and adjusts the position of the screen 3. The relative position of the light guide portion 3a with respect to the first optical fiber F1 and the second optical fiber F2 is adjusted by the third driving portion 23 adjusting the position of the screen 3.

Figure 9:
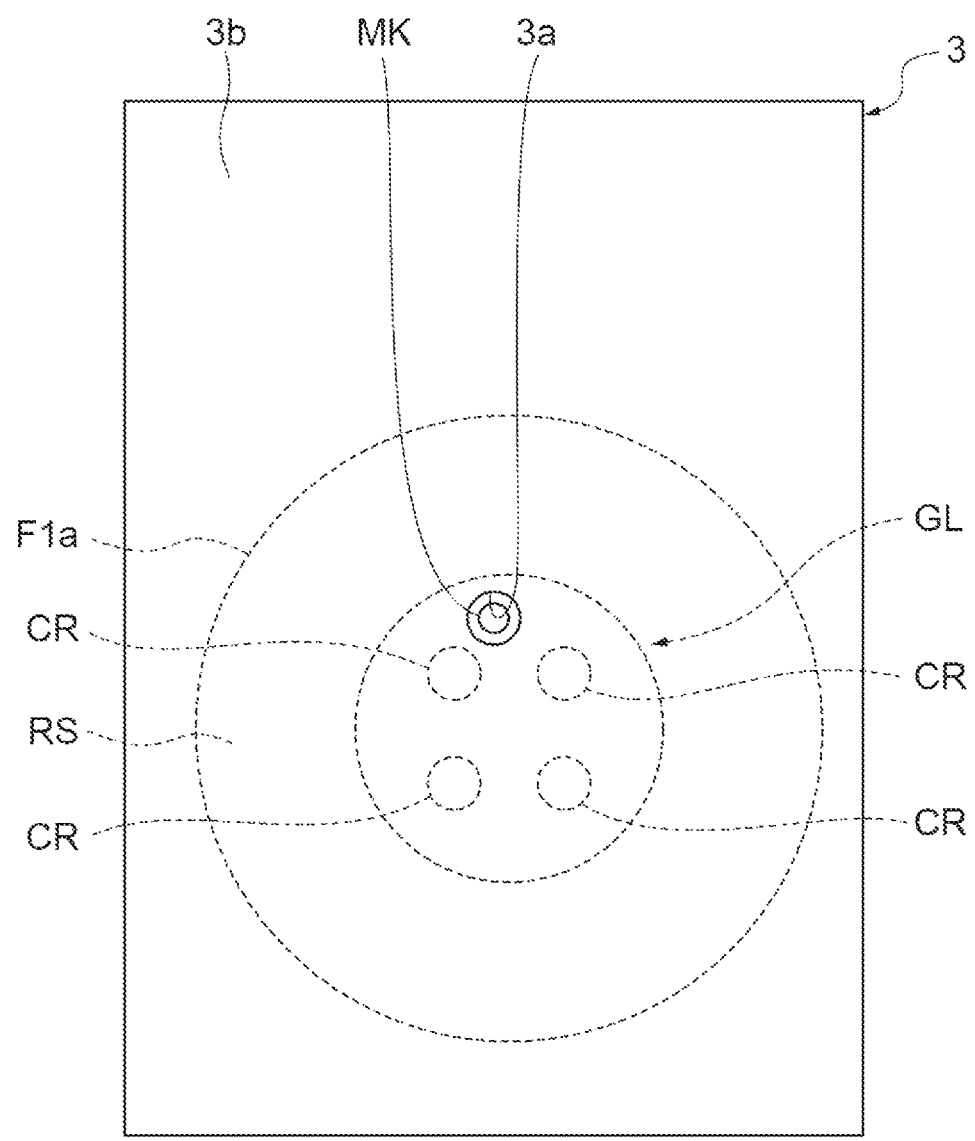
FIG. 9 is a diagram illustrating a state in which the light guide portion is aligned with a marker of the first optical fiber in the axial direction of the first optical fiber.

FIGS. 5 to 8 are diagrams illustrating a state in which the light guide portion 3a is aligned with any of the plurality of cores CR of the first optical fiber F1 in the axial direction of the first optical fiber F1. FIG. 9 is a diagram illustrating a state in which the light guide portion 3a is aligned with the marker MK of the first optical fiber F1 in the axial direction of the first optical fiber F1. As illustrated in FIGS. 5 to 8, the third driving unit 23 adjusts the position of the screen 3 such that the light guide portion 3a is aligned with any of the plurality of cores CR of the first optical fiber F1 in the axial direction of the first optical fiber F1. As shown in FIG. 9, the third driving unit 23 adjusts the position of the screen 3 such that the light guide portion 3a is aligned with the marker MK of the first optical fiber F1 in the axial direction of the first optical fiber F1. The third driving unit 23 moves the screen 3 to dispose the screen 3 between the end face F1a and the end face F2a or to retract the screen 3 from the position between the end face F1a and the end face F2a. The third driving unit 23 includes, for example, a motor.

The fusion splicer 1A further includes a pair of discharge electrodes 2. The pair of discharge electrodes 2 is disposed at a position where the end face F1a faces the end face F2a. The pair of discharge electrodes 2 are disposed so as to face each other along the X-axis direction intersecting both the Z-axis direction and the Y-axis direction. The pair of discharge electrodes 2 is a heating unit that heats the end faces F1a and F2a by discharge in order to melt the end faces F1a and F2a in a state in which the end faces F1a and F2a are close to each other. The end face F1a and the end face F2a are heated and melted in a state of being close to each other, and the first optical fiber F1 and the second optical fiber F2 are fusion-spliced.

The fusion splicer 1A further includes a control unit 4A. The control unit 4A can be configured by, for example, a computer including a CPU and a memory. The control unit 4A is electrically connected to a power source that supplies power to the discharge electrodes 2, and controls the discharge current and the discharge time of the discharge electrodes 2. Thus, the fusion splicing is performed under conditions suitable for the types of the first optical fiber F1 and the second optical fiber F2. The control unit 4A controls operations of the first driving unit 21, the second driving unit 22, and the third driving unit 23. The operations of the first driving unit 21 and the second driving unit 22 include an operation of bringing the end face F1a close to the end face F2a, an operation of adjusting the relative position between the end face F1a and the end face F2a in the XY plane (that is, axial alignment), and an operation of adjusting the relative rotation angle θ between the end face F1a and the end face F2a. The operation of the third driving unit 23 includes an operation of adjusting the position of the screen 3, an operation of disposing the screen 3 between the end face F1a and the end face F2a, and an operation of retracting the screen 3 from the position between the end face F1a and the end face F2a.

The alignment of the first optical fiber F1 and the second optical fiber F2 by the control unit 4A is performed as follows. First, the vicinity of the end face F1a and the end face F2a is imaged using cameras located laterally (in two directions intersecting the Z-axis direction and orthogonal to each other) with respect to the end face F1a and the end face F2a. Then, the control unit 4A controls the first driving unit 21 and the second driving unit 22 so that the central axes of the first optical fiber F1 and the second optical fiber F2 included in the observation image coincide with each other.

Figure 10:
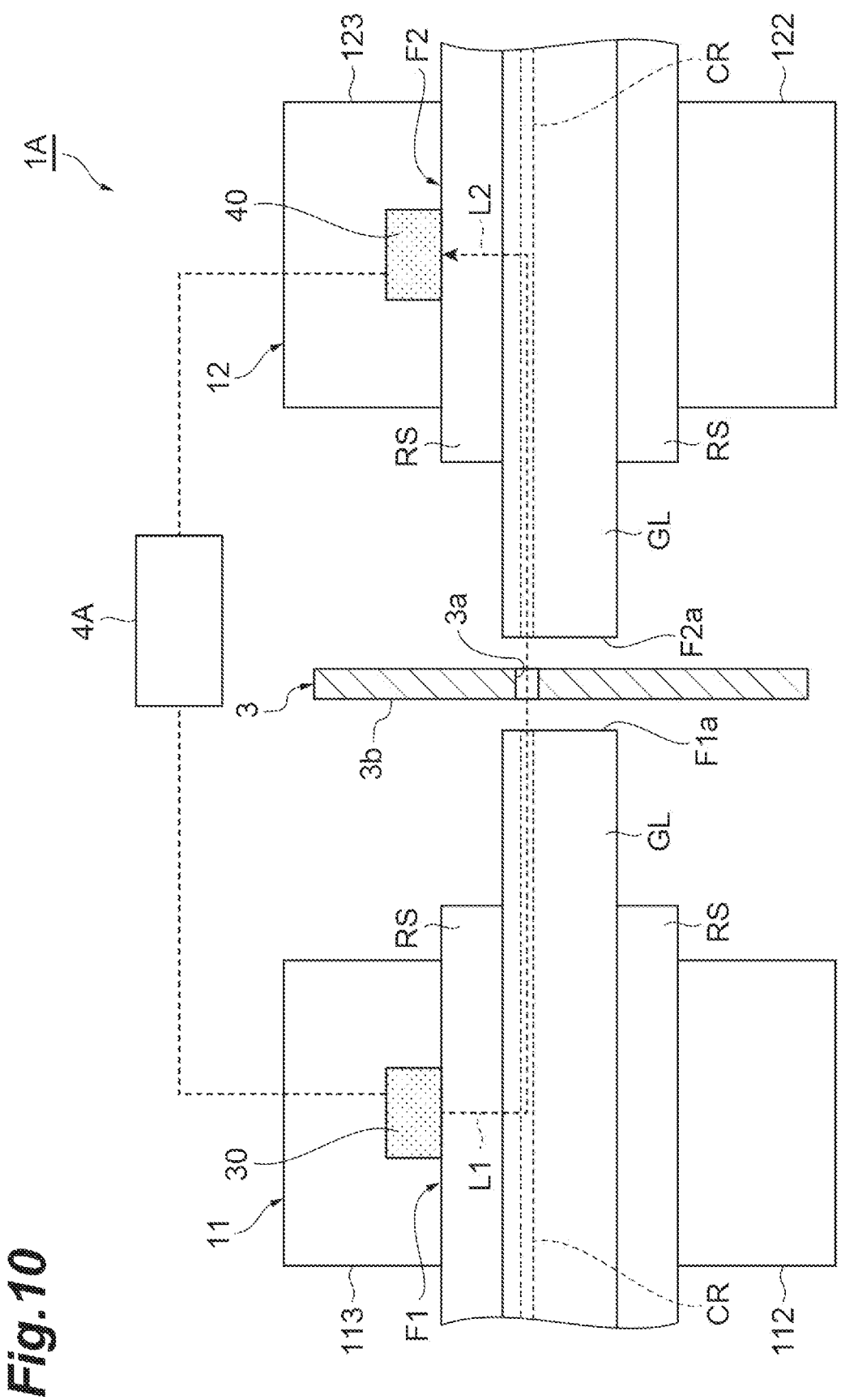
FIG. 10 is a diagram schematically illustrating a cross section of the first holding unit and the second holding unit along the YZ plane.

FIG. 10 is a diagram schematically illustrating a cross section of the first holding unit 11 and the second holding unit 12 along the YZ plane. As shown in FIG. 10, the fusion splicer 1A further includes a light source 30 and a first measurement device 40. The light source 30 makes the test light L1 incident on the first optical fiber F1. To be specific, the light source 30 irradiates the resinous coating RS of the first optical fiber F1 with the test light L1. In one example, the light source 30 is provided so as to contact the first optical fiber F1 inside the first holding unit 11. The light source 30 may be provided so as to press the resinous coating RS of the first optical fiber F1. The arrangement of the light source 30 is not limited thereto, and the light source 30 may be provided outside the first holding unit 11. The light source 30 may be disposed away from the first optical fiber F1. In this case, the first optical fiber F1 may be bent to form a curved portion, and the test light L1 may be incident on the curved portion. The position at which the light source 30 emits the test light L1 toward the first optical fiber F1 is a position away from the end face F1a in the Z-axis direction to such an extent that the propagation of the test light L1 in the common cladding CL is sufficiently attenuated at the end face F1a. The test light L1 emitted from the end face F1a of the first optical fiber F1 enters the end face F2a of the second optical fiber F2.

The first measurement device 40 measures the intensity of a leakage light L2 leaking from the second optical fiber F2. The first measurement device 40 is a power meter. The first measurement device 40 measures the intensity of the leakage light L2 leaking through the resinous coating RS of the second optical fiber F2 in a state where the end face F2a is close to the end face F1a. In one example, the first measurement device 40 is provided so as to contact the second optical fiber F2 inside the second holding unit 12. The arrangement of the first measurement device 40 is not limited thereto, and the first measurement device 40 may be provided outside the second holding unit 12. The first measurement device 40 may be disposed away from the second optical fiber F2. In this case, the second optical fiber F2 may be bent to form a curved portion, and the leakage light L2 leaking from the curved portion may be detected.

The light source 30 and the first measurement device 40 are electrically connected to the control unit 4A shown in FIG. 1. The control unit 4A controls the output operation of the test light L1 in the light source 30, and inputs a signal related to the light intensity of the leakage light L2 detected by the first measurement device 40 from the first measurement device 40. The test light L1 applied to the resinous coating RS of the first optical fiber F1 passes through the resinous coating RS of the first optical fiber F1, enters the glass portion GL, and is collected in the cores CR and the marker MK. When the screen 3 is retracted from the position between the end faces F1a and F2a, the test light L1 propagates through the cores CR and the marker MK of the first optical fiber F1 and then propagates through the cores CR and the marker MK of the second optical fiber F2, and the leakage light L2 leaks through the resinous coating RS of the second optical fiber F2. What is detected by the first measurement device 40 is the leakage light L2. In FIG. 10, one core CR among a plurality of cores CR and a marker MK is representatively illustrated.

In a case where the position of the core CR of the first optical fiber F1 deviates from the position of the core CR of the second optical fiber F2, the test light L1 is less likely to propagate from the core CR of the first optical fiber F1 to the core CR of the second optical fiber F2 as the deviation amount increases. Then, the intensity of the leakage light L2 detected by the first measurement device 40 decreases. Similarly, in a case where the position of the marker MK of the first optical fiber F1 deviates from the position of the marker MK of the second optical fiber F2, the test light L1 is less likely to propagate from the marker MK of the first optical fiber F1 to the marker MK of the second optical fiber F2 as the deviation amount increases. Then, the intensity of the leakage light L2 detected by the first measurement device 40 decreases. Therefore, the control unit 4A controls one or both of the first driving unit 21 and the second driving unit 22 to adjust the relative rotation angle θ between the end face F1a and the end face F2a so that the intensity of the leakage light L2 detected by the first measurement device 40 approaches the maximum value. Thus, the position of the core CR of the first optical fiber F1 and the position of the core CR of the second optical fiber F2 can be matched with each other.

When the screen 3 is disposed between the end face F1a and the end face F2a, the test light L1 that has propagated through the core CR facing the light guide portion 3a among the plurality of cores CR of the first optical fiber F1 passes through the light guide portion 3a. Among the plurality of cores CR of the first optical fiber F1, the test light L1 propagated through the core CR opposed to the light shielding portion 3b is shielded by the light shielding portion 3b. The test light L1 that has passed through the light guide portion 3a propagates through the core CR of the second optical fiber F2 that faces the light guide portion 3a, and the leakage light L2 leaks through the resinous coating RS of the second optical fiber F2.

Similarly, when the screen 3 is disposed between the end faces F1a and F2a and the marker MK of the first optical fiber F1 faces the light guide portion 3a, the test light L1 emitted from the marker MK passes through the light guide portion 3a. At that time, the test light L1 other than the test light L1 emitted from the marker MK is shielded by the light shielding portion 3b. The test light L1 that has passed through the light guide portion 3a propagates through the marker MK of the second optical fiber F2, and the leakage light L2 leaks through the resinous coating RS of the second optical fiber F2.

Figure 11:
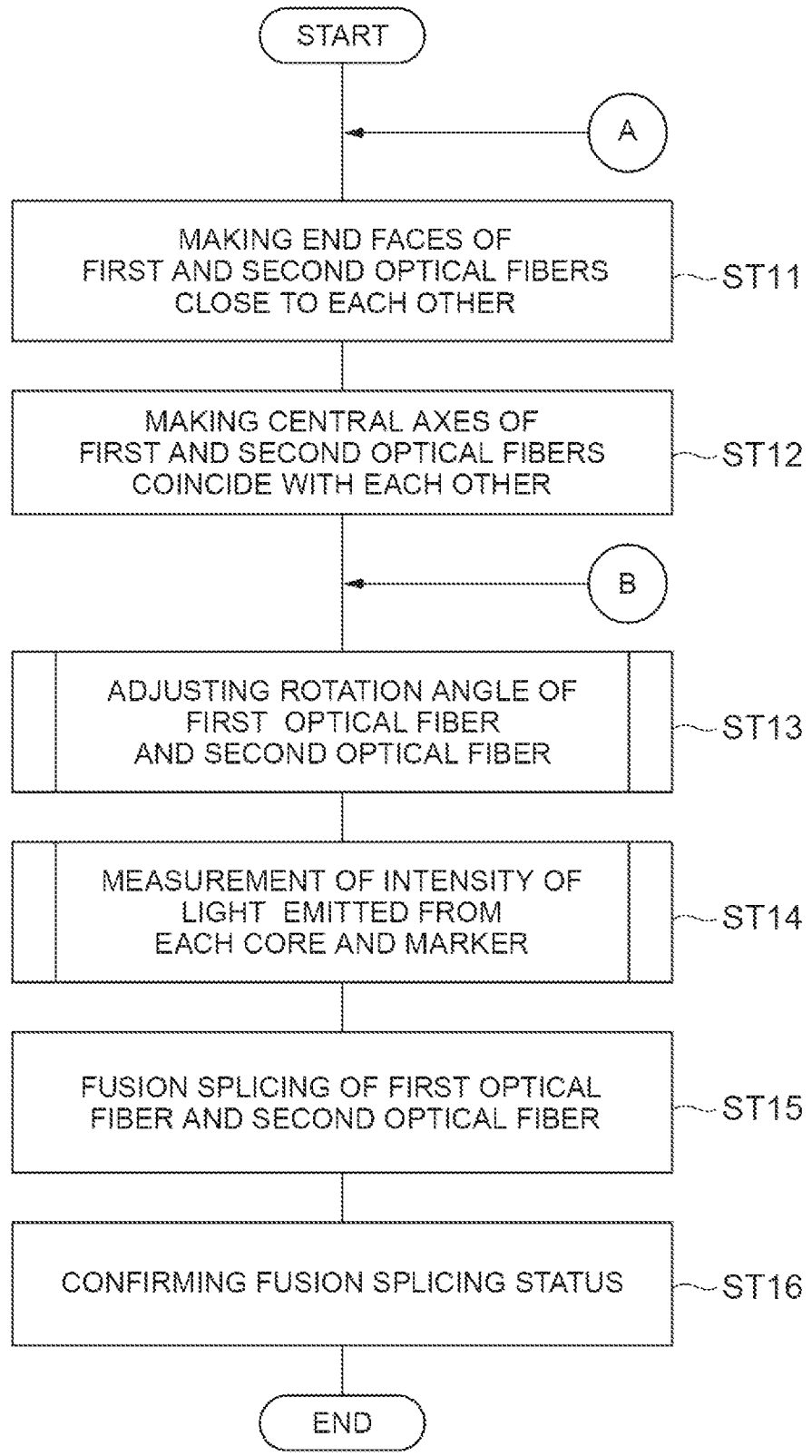
FIG. 11 is a flowchart showing operation of the fusion splicer.

FIG. 11 is a flowchart showing the operation of the fusion splicer 1A. The operation of the fusion splicer 1A and the fusion splicing method according to the present embodiment will be described with reference to FIG. 11. When the screen 3 is disposed between the end face F1a and the end face F2a, the fusion splicer 1A retracts the screen 3 from the position between the end face F1a and the end face F2a. First, in step ST11, the control unit 4A controls the first driving unit 21 and the second driving unit 22 so that the end faces F1a and F2a close to each other. Thus, the end faces F1a and F2a face each other. However, there is a slight clearance between the end faces F1a and F2a. For example, a clearance of 50 µm or less is present between the end faces F1a and F2a. Next, in step ST12, the vicinity of the end face F1a and the end face F2a is imaged using cameras disposed laterally with respect to the end face F1a and the end face F2a. Then, the control unit 4A controls the first driving unit 21 and the second driving unit 22 so that the central axes of the first optical fiber F1 and the second optical fiber F2 included in the observation image coincide with each other.

Figure 12:
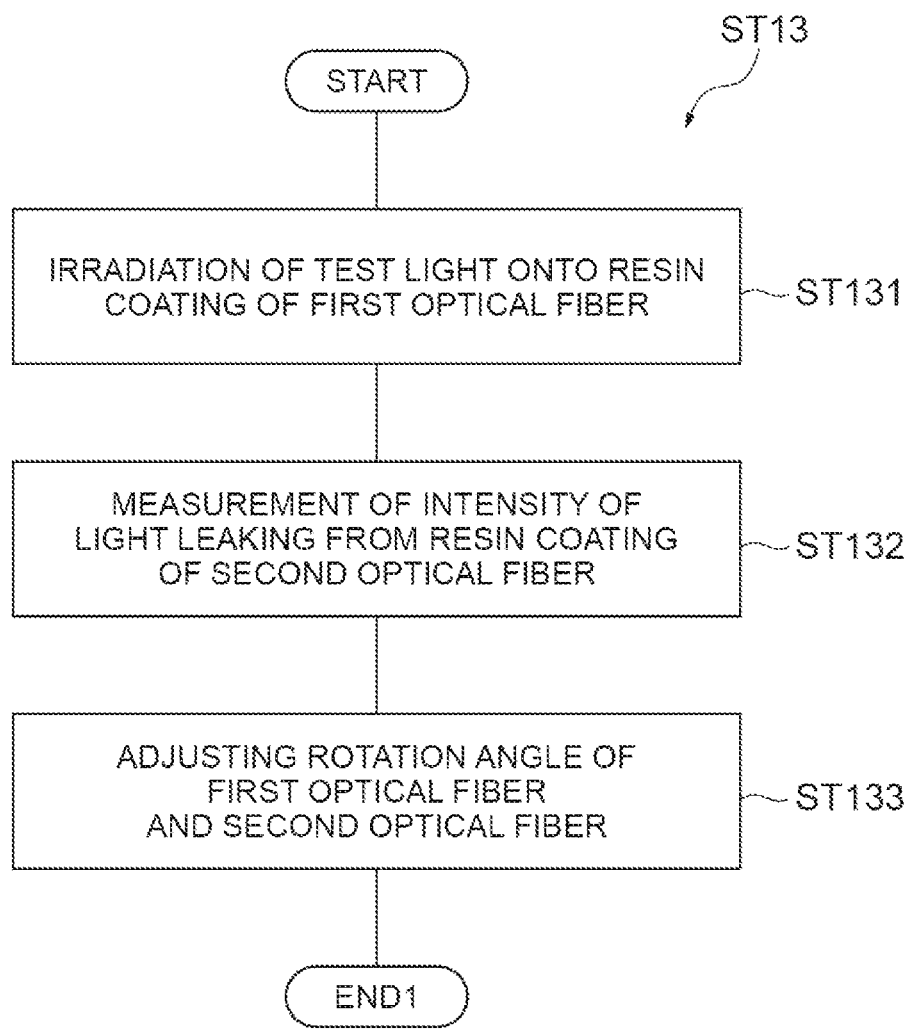
FIG. 12 is a flowchart showing operations when the fusion splicer adjusts the relative rotation angle between the first optical fiber and the second optical fiber.

In step ST13, the relative rotation angle θ of the first optical fiber F1 and the second optical fiber F2 is adjusted. The details of step ST13 will be described with reference to FIG. 12. FIG. 12 is a flowchart showing an operation when the fusion splicer 1A adjusts the relative rotation angle θ between the first optical fiber F1 and the second optical fiber F2. In step ST131, the light source 30 irradiates the resinous coating RS of the first optical fiber F1 with the test light L1. Then, in step ST132, the first measurement device 40 measures the intensity of the leakage light L2 leaking through the resinous coating RS of the second optical fiber F2. In step ST133, the control unit 4A adjusts the relative rotation angle θ between the first optical fiber F1 and the second optical fiber F2 based on the intensity of the leakage light L2 measured in step ST132. At that time, the control unit 4A controls one or both of the first driving unit 21 and the second driving unit 22 to adjust the relative rotation angle θ between the end face F1a and the end face F2a so that the intensity of the leakage light L2 measured by the first measurement device 40 approaches the maximum value. The control unit 4A records a first intensity which is a maximum value of the intensity of the leakage light L2 measured by the first measurement device 40.

Figure 13:
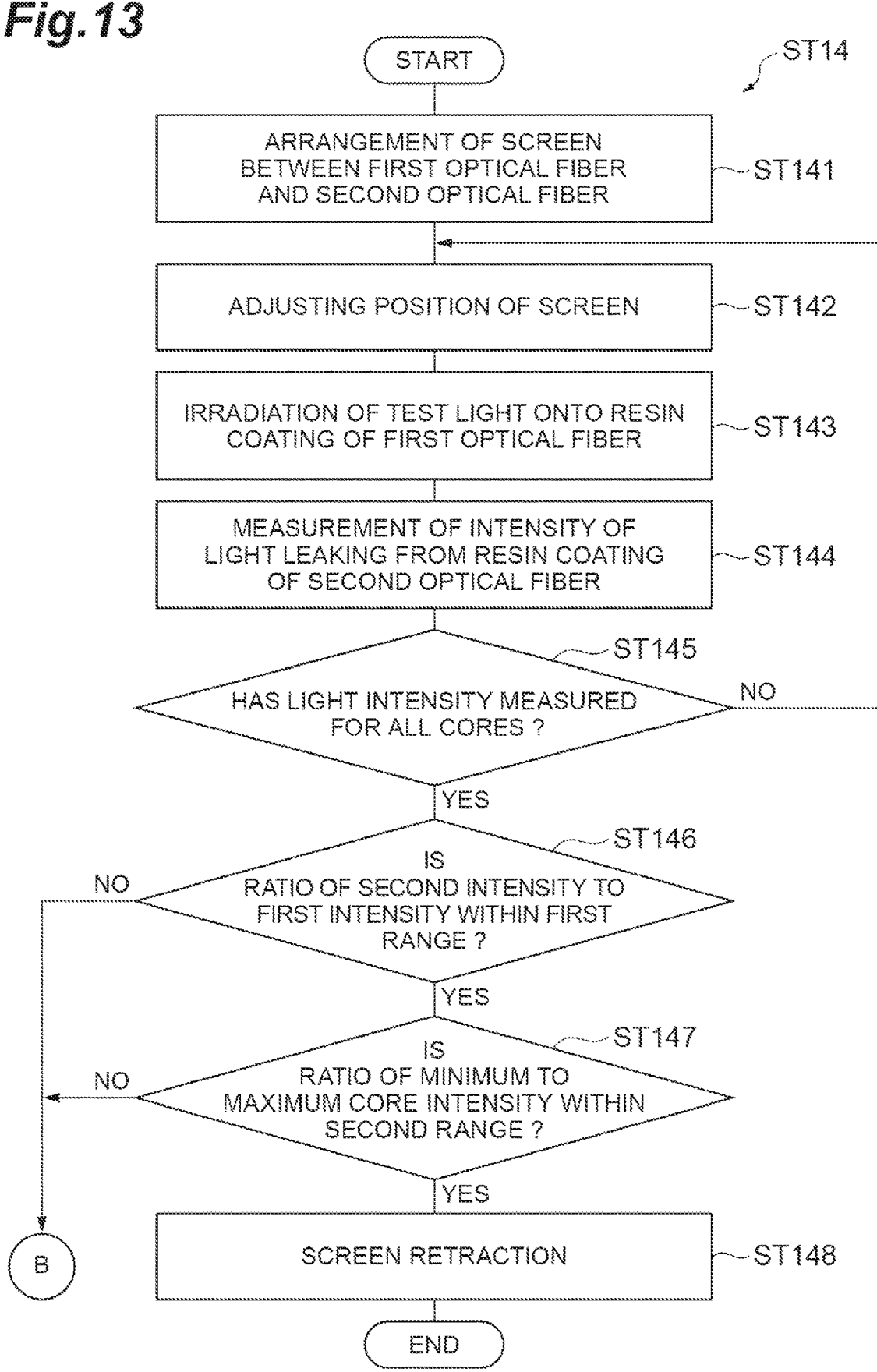
FIG. 13 is a flowchart showing an operation when the fusion splicer measures the intensity of the test light emitted from the core of the first optical fiber for each core and measures the intensity of the test light emitted from the marker of the first optical fiber.

Reference is again made to FIG. 11. In step ST14, the intensity of the test light L1 emitted from the plurality of cores CR of the first optical fiber F1 is measured for each core CR, and the intensity of the test light L1 emitted from the marker MK of the first optical fiber F1 is measured. The details of step ST14 will be described with reference to FIG. 13. FIG. 13 is a flowchart showing an operation when the fusion splicer 1A measures the intensity of the test light L1 emitted from the core CR of the first optical fiber F1 for each core CR and measures the intensity of the test light L1 emitted from the marker MK of the first optical fiber F1. In step ST141, the third driving unit 23 arranges the screen 3 between the end face F1a and the end face F2a. In step ST142, the third driving unit 23 adjusts the position of the screen 3. To be more specific, the third driving unit 23 adjusts the position of the screen 3 so that the light guide portion 3a is aligned with any one of the plurality of cores CR or the marker MK of the first optical fiber F1 in the axial direction of the first optical fiber F1.

The third driving unit 23 may adjust the position of the screen 3 based on the coordinates of the cores CR and the coordinates of the marker MK of the first optical fiber F1 grasped by cameras positioned laterally with respect to the region between the end face F2a and the end face F1. The third driving unit 23 may adjust the position of the screen 3 based on the position of the marker MK of the first optical fiber F1 grasped by the cameras and the data related to the coordinates of each core of the first optical fiber F1 and the coordinates of the marker MK.

Then, in step ST143, the light source 30 irradiates the resinous coating RS of the first optical fiber F1 with the test light L1. Then, in step ST144, the first measurement device 40 measures the intensity of the leakage light L2 leaking through the resinous coating RS of the second optical fiber F2. The control unit 4A records the intensity of the leakage light L2 corresponding to each core CR of the first optical fiber F1 among the leakage light L2 measured by the first measurement device 40 as the core intensity. The control unit 4A records the intensity of the leakage light L2 corresponding to the marker MK of the first optical fiber F1 among the leakage light L2 measured by the first measurement device 40 as the marker intensity. The control unit 4A substantially measures the intensity of the test light L1 by measuring the intensity of the leakage light L2. The control unit 4A records the core intensity in association with each of the plurality of cores CR of the first optical fiber F1. To be specific, the core intensity is recorded in association with the coordinates of each of the plurality of cores CR of the first optical fiber F1. Then, in step ST145, the control unit 4A determines whether or not the intensity of the test light L1 emitted from each of all the cores CR and the marker MK of the first optical fiber F1 has been measured. When there is an unmeasured core CR or an unmeasured marker MK among the plurality of cores CR and marker MK of the first optical fiber F1, the control unit 4A adjusts the position of the screen 3 such that the light guide portion 3a is aligned with one of the unmeasured core CR and the unmeasured marker MK in the axial direction of the first optical fiber F1. Then, steps ST142 to ST144 are performed again.

When the control unit 4A determines that the intensity of the test light L1 emitted from each of all the cores CR and the marker MK of the first optical fiber F1 is measured in step ST145, the control unit 4A calculates a second intensity which is the sum of the core intensities corresponding to each of the plurality of cores CR of the first optical fiber F1 in step ST146. The second intensity may further include a marker intensity. Then, the control unit 4A calculates a ratio of the second intensity to the first intensity. The control unit 4A determines whether or not the ratio of the second intensity to the first intensity is within a predetermined first range. The predetermined first range defines, for example, a range of values obtained by dividing the second intensity by the first intensity.

In step ST146, when the control unit 4A determines that the ratio of the second intensity to the first intensity is within the predetermined first range, step ST147 is performed. In step ST146, when the control unit 4A determines that the ratio of the second intensity to the first intensity is not within the predetermined first range, the process returns to step ST13, and each step is performed in the order of the flowchart illustrated in FIG. 11.

In step ST147, the control unit 4A calculates a ratio of the minimum core intensity to the maximum core intensity. The maximum core intensity is the maximum core intensity among the core intensities corresponding to the plurality of cores CR of the first optical fiber F1. The maximum core intensity may be a maximum value of the marker intensity and the core intensity corresponding to each of the plurality of cores CR of the first optical fiber F1. The minimum core intensity is a minimum core intensity among the core intensities corresponding to the plurality of cores CR of the first optical fiber F1. The minimum core intensity may be a minimum value of the marker intensity and the core intensity corresponding to each of the plurality of cores CR of the first optical fiber F1. The control unit 4A determines whether or not the ratio of the minimum core intensity to the maximum core intensity is within a predetermined second range. The predetermined second range defines, for example, a range of values obtained by dividing the minimum core intensity by the maximum core intensity.

In step ST147, when the control unit 4A determines that the ratio of the minimum core intensity to the maximum core intensity is within the predetermined second range, step ST148 is performed. In step ST147, when the control unit 4A determines that the ratio of the minimum core intensity to the maximum core intensity is not within the predetermined second range, the process returns to step ST13, and each step is performed in the order of the flowchart illustrated in FIG. 11.

In step ST148, the control unit 4A retracts the screen 3 from the position between the end face F1a and the end face F2a.

Figure 14:
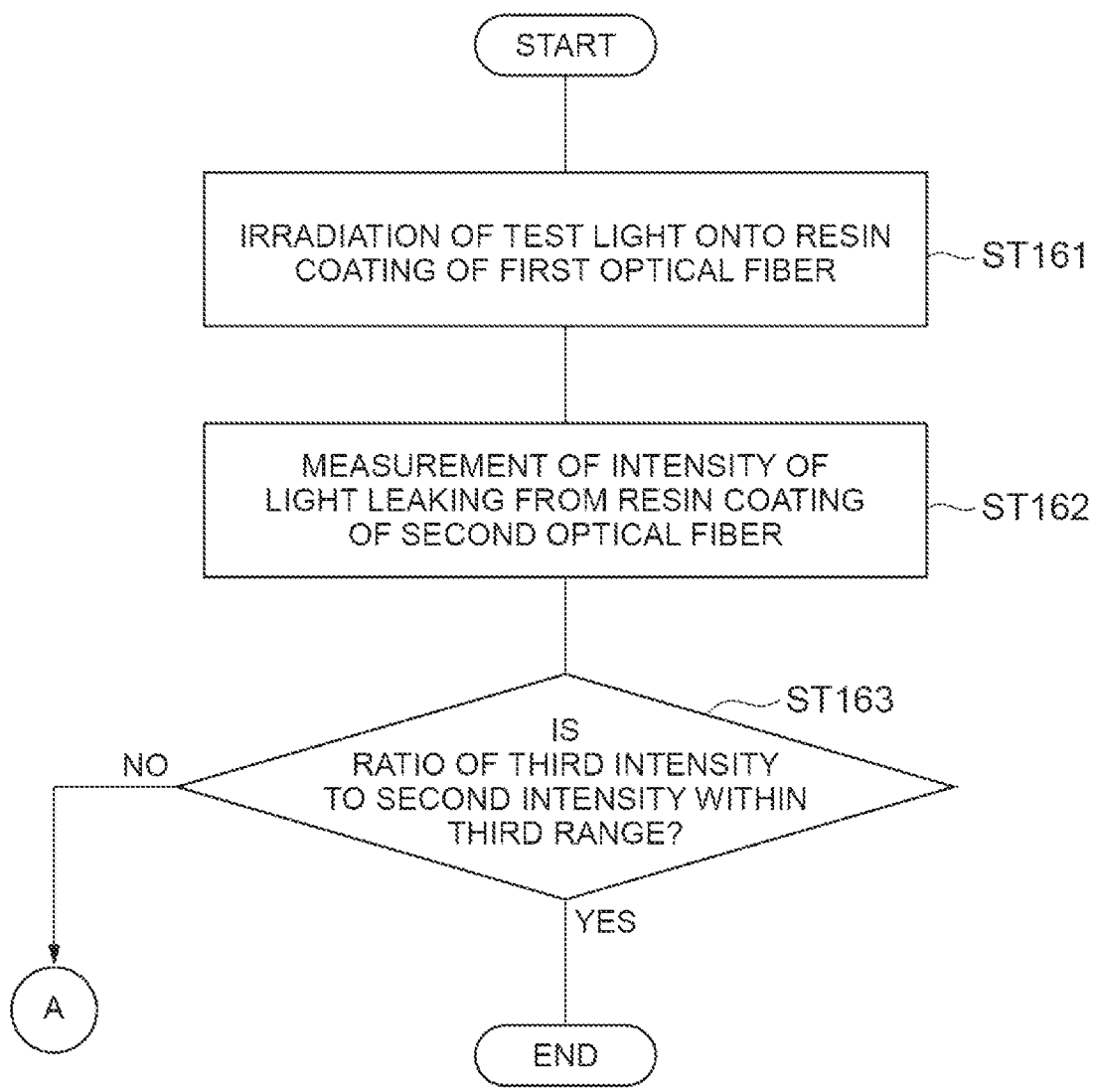
FIG. 14 is a flowchart showing an operation when the fusion splicer confirms the fusion spliced state between the end face of the first optical fiber and the end face of the second optical fiber.

Reference is again made to FIG. 11. In step ST15, discharge is performed between the pair of discharge electrodes 2, and the end faces F1a and F2a of the first optical fiber F1 and the second optical fiber F2 are heated, melted, and fusion-spliced to each other. Then, in step ST16, the fusion splicing state between the end face F1a and the end face F2a is confirmed. The details of step ST16 will be described with reference to FIG. 14. FIG. 14 is a flowchart showing an operation when the fusion splicer 1A confirms the fusion spliced state between the end face F1a and the end face F2a.

In step ST161, the light source 30 irradiates the resinous coating RS of the first optical fiber F1 with the test light L1. Then, in step ST162, the first measurement device 40 measures the intensity of the leakage light L2 leaking through the resinous coating RS of the second optical fiber F2. The control unit 4A records the third intensity that is the intensity of the leakage light L2 measured by the first measurement device 40. In step ST163, the control unit 4A determines whether or not a ratio of the third intensity to the second intensity is within a predetermined third range. The predetermined third range defines, for example, a range of values obtained by dividing the third intensity by the second intensity. When the ratio of the third intensity to the second intensity is within a predetermined third range, the control unit 4A determines that the fusion splicing state between the end face F1a and the end face F2a is normal. When the ratio of the third intensity to the second intensity is out of a predetermined third range, the control unit 4A determines that the fusion splicing state between the end face F1a and the end face F2a is abnormal. The control unit 4A is an example of a determination unit in the present embodiment.

In step ST163, when the control unit 4A determines that the fusion splicing state between the end face F1a and the end face F2*a* is abnormal, the fusion splicer 1A may notify the user that the fusion splicing state between the end face F1*a* and the end face F2*a* is abnormal. In that case, the fusion splicer 1A may further include a configuration that outputs a signal that allows the user to visually or aurally perceive that the fusion spliced state between the end face F1*a* and the end face F2*a* is abnormal. In step ST163, when the control unit 4A determines that the fusion splicing state between the end face F1*a* and the end face F2*a* is abnormal, the process returns to step ST11, and each step is performed in the order of the flowchart illustrated in FIG. 11.

Effects obtained by the fusion splicer 1A and the fusion splicing method of the present embodiment having the above-described configuration will be described. In the fusion splicer 1A of this embodiment, the test light L1 emitted from one of the cores CR of the first optical fiber F1 by the light guide portion 3*a* passes through the screen 3. Also in the fusion splicing method of the present embodiment, the test light L1 other than the test light L1 emitted from one of the cores CR of the first optical fiber F1 is shielded. Therefore, the first measurement device 40 can measure the intensity of the test light L1 emitted from any core CR of the first optical fiber F1 by measuring the intensity of the leakage light L2 leaking from the second optical fiber F2. Furthermore, in the fusion splicer 1A of the present embodiment, the third driving unit 23 adjusts the position of the screen 3 such that the light guide portion 3*a* is aligned with any of the plurality of cores CR of the first optical fiber F1 in the axial direction of the first optical fiber F1. Therefore, by measuring the intensity of the leakage light L2 leaking from the second optical fiber F2, the first measurement device 40 can measure the intensity of the test light L1 emitted from each of the plurality of cores CR included in the first optical fiber F1 for each core CR. Also in the fusion splicing method of the present embodiment, the step of measuring the intensity of the leakage light L2 leaking from the second optical fiber F2 is performed for each of the plurality of cores CR of the first optical fiber F1 in a state where the test light L1 other than the test light L1 emitted from one core CR of the first optical fiber F1 among the test light L1 emitted from the end the end face F1*a* of the first optical fiber F1 is shielded. Accordingly, it is possible to confirm the guiding state of light of each of the plurality of cores CR of the first optical fiber F1, the guiding state of light of each of the plurality of cores CR of the second optical fiber F2, and the positional relationship between the plurality of cores CR of the first optical fiber F1 and the plurality of cores CR of the second optical fiber F2. The light guiding state of the individual cores CR can thus be confirmed.

As described above, the first measurement device 40 may measure the first intensity, which is the intensity of the leakage light L2, in a state where the third driving unit 23 retracts the screen 3 from the position between the end faces F1*a* and F2*a* and the first driving unit 21 and the second driving unit 22 adjust the rotation angle θ so that the leakage light L2 measured by the first measurement device 40 has the maximum intensity. The first measurement device 40 may measure the core intensity of each of the plurality of cores CR of the first optical fiber F1. The core intensity may be the intensity of the leakage light L2 in a state where the third driving unit 23 adjusts the position of the screen 3 so that the light guide portion 3*a* is aligned with one core CR among the plurality of cores CR of the first optical fiber F1 in the axial direction of the first optical fiber F1. Then, when the ratio of the second intensity to the first intensity, which is the sum of the core intensities corresponding to the plurality of cores CR of the first optical fiber F1, is within a predetermined first range, the end face F1*a* may be fusion-spliced to the end face F2*a*. In this case, theoretically, the second intensity has a predetermined ratio to the first intensity. However, when the light guide portion 3*a* is aligned with each of the cores CR of the first optical fiber F1 in the axial direction of the first optical fiber F1, a positional deviation occurs, so that the second intensity becomes smaller than the predetermined ratio with respect to the first intensity. Therefore, by checking the ratio of the second intensity to the first intensity, it is possible to confirm whether or not the position of the screen 3 is an appropriate position.

As described above, when the ratio of the minimum core intensity to the maximum core intensity among the core intensities corresponding to the plurality of cores CR of the first optical fiber F1 is within the predetermined second range, the end face F1*a* may be fusion-spliced to the end face F2*a*. In a case where dust, a flaw, or the like is present in any one of the plurality of cores CR of the first optical fiber F1, the core intensity corresponding to the core CR is smaller than the core intensity corresponding to the core CR in which dust, a flaw, or the like is not present. According to the above configuration, by checking that the ratio of the minimum core intensity to the minimum core intensity is within the predetermined second range, it is possible to confirm that there is no dust, scratch, or the like in the core CR corresponding to the minimum core intensity. Therefore, it is possible to confirm the guiding state of light of each of the plurality of cores CR.

As described above, in a state where the end face F1*a* is fusion-spliced to the end face F2*a*, the first measurement device 40 may measure the third intensity which is the intensity of the leakage light L2. The fusion splicer 1A may further include a control unit 4A (determination unit) that determines a state of fusion splicing between the end face F1*a* and the end face F2*a*. The control unit 4A may determine that the state of fusion splicing between the end face F1*a* and the end face F2*a* is abnormal when a ratio of the third intensity to the second intensity, which is a sum of core intensities corresponding to the plurality of cores CR of the first optical fiber F1, is outside the predetermined third range. In that case, the third intensity has a predetermined ratio to the second intensity in theory. However, the ratio of the third intensity to the second intensity may become smaller than the predetermined ratio due to positional deviation between the plurality of cores CR of the first optical fiber F1 and the plurality of cores CR of the second optical fiber F2 that occurs at the time of fusion. In the above configuration, when the ratio of the third intensity to the second intensity is outside the predetermined third range, it is determined that the state of the fusion splicing between the end face F1*a* and the end face F2*a* is abnormal. As a result, it is possible to detect the positional deviation between the plurality of cores CR of the first optical fiber F1 and the plurality of cores CR of the second optical fiber F2, which occurs at the time of fusion.

As described above, each of the first optical fiber F1 and the second optical fiber F2 may further include the marker MK. The third driving unit 23 may further adjust the screen 3 so that the light guide portion 3*a* is aligned with the marker MK in the axial direction of the first optical fiber F1. By using the markers MK as a position reference of the rotation angle θ around the first optical fiber F1 and the rotation angle θ around the second optical fiber F2, it is possible to prevent erroneous connection of the cores CR even when the core CR arrangement has rotational symmetry.

As described above, the light guide portion 3a may be a through hole. In that case, for example, compared to a case where the light guide portion 3a is formed of a transparent flat plate, it is possible to suppress reflection of the test light L1 by the light guide portion 3a when the test light L1 passes through the light guide portion 3a. Therefore, it is possible to prevent the test light L1 from returning to the light source 30 and affecting the operation of the light source 30.

As described above, the light shielding portion 3b of the screen 3 may have a non-reflective coating. In that case, it is possible to suppress the test light L1 from being reflected by the screen 3. Therefore, it is possible to prevent the test light L1 from returning to the light source 30 and affecting the operation of the light source 30.

Figure 15:
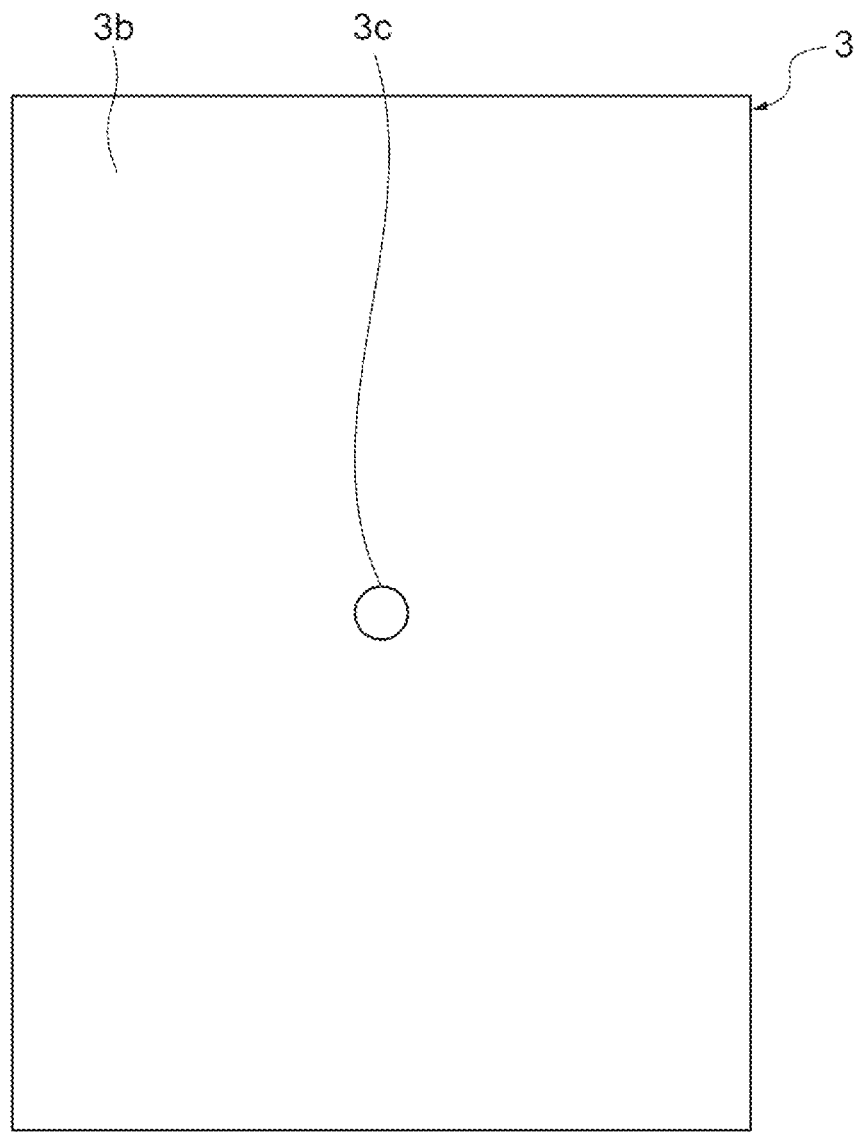
FIG. 15 is a front view of a screen in which the light guide portion is a condenser lens.

In the present embodiment, the light guide portion 3a may be a condenser lens. FIG. 15 is a front view of the screen 3 in which the light guide portion 3a is the condenser lens 3c. The condenser lens 3c condenses the test light L1 emitted from any of the cores CR of the first optical fiber F1 toward the condenser lens 3c toward the core CR of the second optical fiber F2 corresponding to the core CR from which the test light L1 is emitted. The condenser lens 3c condenses the test light L1 emitted from the marker MK of the first optical fiber F1 toward the condenser lens 3c toward the marker MK of the second optical fiber F2. In that case, the test light L1 emitted from the end face F1a is condensed toward the end face F2a by the condenser lens 3c. Therefore, it is possible to suppress leakage of the test light L1 during a period from when the test light L1 is emitted from the end face F1a to when the test light L1 is incident on the end face F2a. Therefore, the amount of test light L1 incident on the end face F2a can be increased, and the amount of leakage light L2 can be increased. As a result, it is possible to improve accuracy when the first measurement device 40 measures the intensity of the leakage light L2.

In the fusion splicing method of the present embodiment, it may be determined whether or not to splice the end face F1a and the end face F2a based on the intensity of the leakage light L2 measured for each of the plurality of cores CR of the first optical fiber F1. In the fusion splicing method of the present embodiment, it may be determined whether or not to splice the end face F1a and the end face F2a based on the intensity of the leakage light L2 measured for each of the plurality of cores CR and the marker MK of the first optical fiber F1. In that case, it is possible to prevent the end face F1a and the end face F2a from being fusion-spliced to each other in a state in which the guiding state of light of the plurality of cores CR is not favorable.

In step ST146, when the control unit 4A determines that the ratio of the second intensity to the first intensity is not within the predetermined first range, the optimal coordinates of each core CR of the first optical fiber F1 at which the core intensity becomes maximum and the optimal coordinates of the marker MK at which the marker intensity becomes maximum are obtained while checking each core intensity and marker intensity. Then, the relative rotation angle θ between the first optical fiber F1 and the second optical fiber F2 may be adjusted based on the mean value of the coordinates. Alternatively, the relative rotation angle θ between the first optical fiber F1 and the second optical fiber F2 may be adjusted based on the optimal coordinates of any one of the cores CR and the marker MK of the first optical fiber F1. The same applies to a case where the control unit 4A determines in step ST147 that the ratio of the minimum core intensity to the maximum core intensity is not within the predetermined second range.

Figure 16:
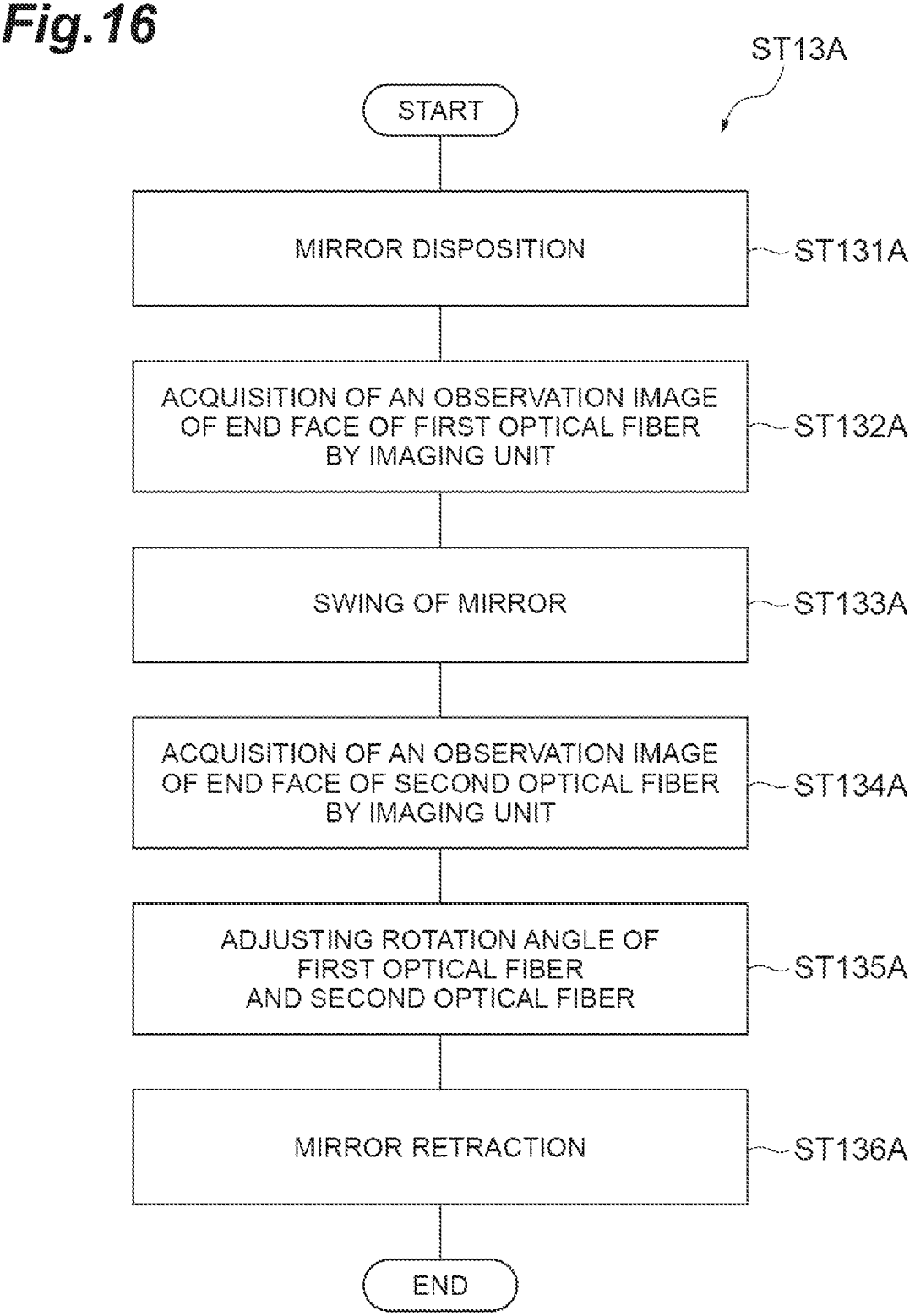
FIG. 16 is a flowchart showing an operation when the fusion splicer adjusts the rotation angle of the first optical fiber and the rotation angle of the second optical fiber using an end face observation.
Figure 17:
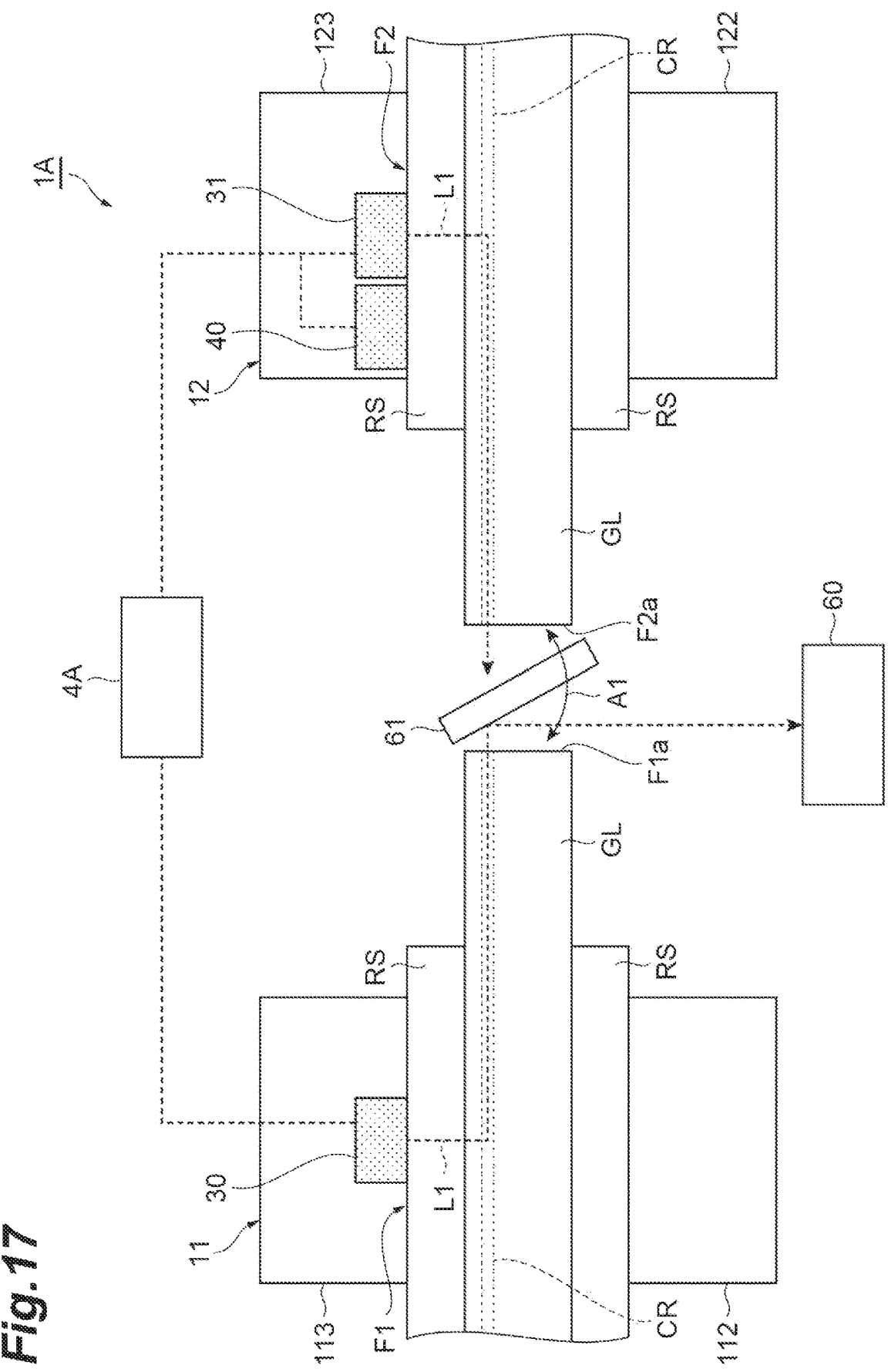
FIG. 17 is a diagram schematically illustrating a cross section of the first holding unit and the second holding unit along the YZ plane.

The fusion splicer 1A may perform the step ST13A shown in FIG. 16 instead of performing the step ST13. In step ST13A, the rotation angle θ of the first optical fiber F1 and the rotation angle θ of the second optical fiber F2 are adjusted using the end face observation. The details of step ST13A will be described with reference to FIGS. 16 and 17. FIG. 16 is a flowchart showing an operation when the fusion splicer 1A adjusts the rotation angle θ of the first optical fiber F1 and the rotation angle θ of the second optical fiber F2 using an end face observation. FIG. 17 is a diagram schematically illustrating a cross section of the first holding unit 11 and the second holding unit 12 along the YZ plane.

As shown in FIG. 17, the fusion splicer 1A further includes a light source 31, an imaging unit 60, and a mirror 61. The light source 31 makes the test light L1 incident on the second optical fiber F2. To be specific, the light source 31 irradiates the resinous coating RS of the second optical fiber F2 with the test light L1. In one example, the light source 31 is provided so as to be in contact with the second optical fiber F2 inside the second holding unit 12.

The imaging unit 60 is a camera that acquires observation images of the end face F1a of the first optical fiber F1 and the end face F2a of the second optical fiber F2, respectively. In the illustrated example, the imaging unit 60 is positioned laterally (in direction along the XY plane in FIG. 1) with respect to the end faces F1a and F2a. The mirror 61 is disposed between the end face F1a of the first optical fiber F1 and the end face F2a of the second optical fiber F2. The angle of the mirror 61 is adjusted along the swinging direction A1 in both a case where the imaging unit 60 images the end face F1a of the first optical fiber F1 and a case where the imaging unit 60 images the end face F2a of the second optical fiber F2. In a state where the mirror 61 is disposed so as to reflect the observation light from the end face F1a of the first optical fiber F1 toward the imaging unit 60, the imaging unit 60 outputs an observation image of the end face F1a of the first optical fiber F1. In a state where the mirror 61 is disposed so as to reflect the observation light from the end face F2a of the second optical fiber F2 toward the imaging unit 60, the imaging unit 60 outputs an observation image of the end face F2a of the second optical fiber F2. The mirror 61 is retracted to a position away from the position between the end face F1a and the end face F2a by the driving unit of the fusion splicer 1A.

In step ST131A, the mirror 61 is disposed between the end face F1a of the first optical fiber F1 and the end face F2a of the second optical fiber F2. In step ST132A, the resinous coating RS of the first optical fiber F1 is irradiated with test light L1. When the image of the first optical fiber F1 is reflected by the mirror 61, the imaging unit 60 acquires an observation image of the end face F1a of the first optical fiber F1. Then, in step 133A, the mirror 61 is swung along the swinging direction A1. Then, in step 134A, the resinous coating RS of the second optical fiber F2 is irradiated with test light L1. When the image of the second optical fiber F2 is reflected by the mirror 61, the imaging unit 60 acquires an observation image of the end face F2a of the second optical fiber F2. In subsequent step ST135A, the relative rotation angle θ between the first optical fiber F1 and the second optical fiber F2 is adjusted based on the observation image of the end face F1a of the first optical fiber F1 and the observation image of the end face F2a of the second optical fiber F2. In step ST136A, the mirror 61 is retracted.

Second Embodiment

Figure 18:
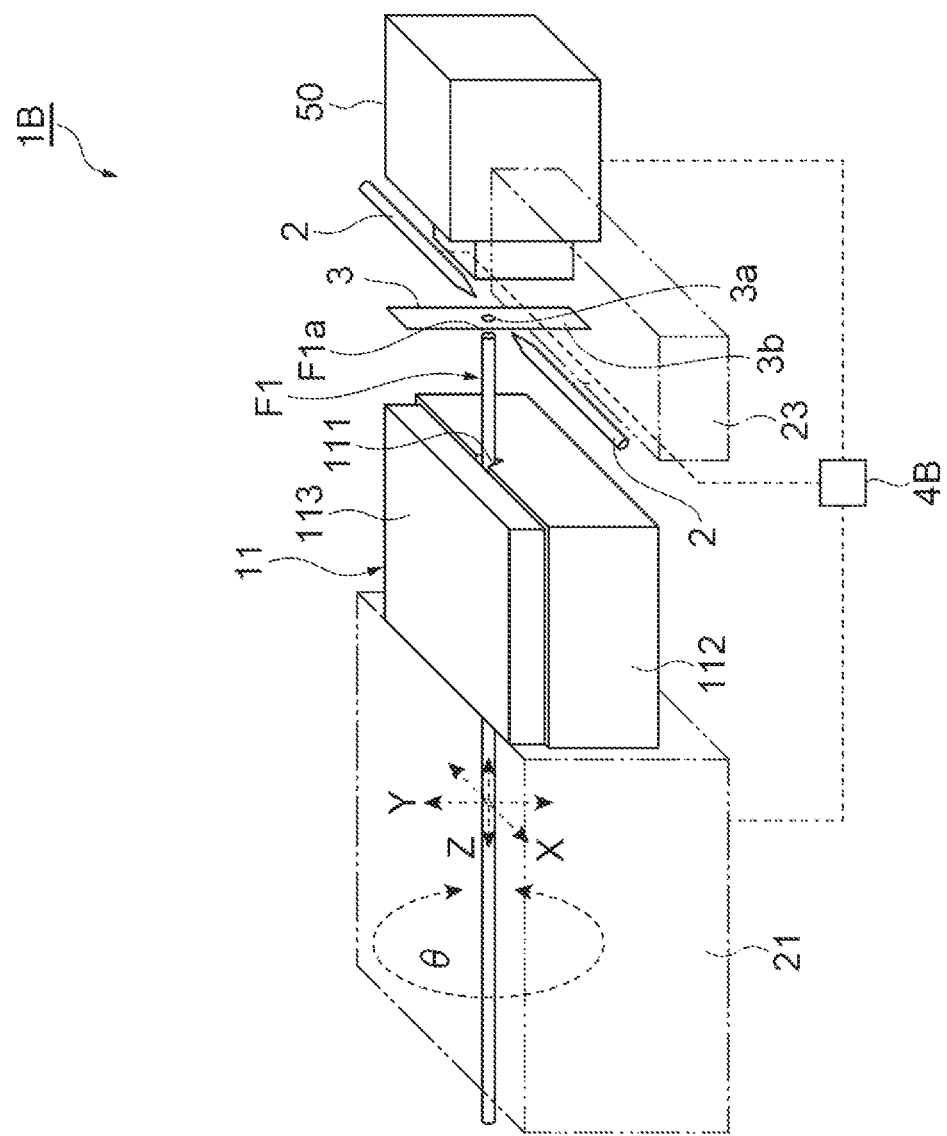
FIG. 18 is a diagram illustrating a part of the configuration of a fusion splicer in accordance with a second embodiment.

FIG. 18 is a diagram illustrating a part of the configuration of a fusion splicer 1B in accordance with the second embodiment. The fusion splicer 1B is mainly different from the fusion splicer 1A according to the first embodiment in that the fusion splicer 1B further includes a second measurement device 50. The fusion splicer 1B includes a control unit 4B instead of the control unit 4A included in the fusion splicer 1A.

The second measurement device 50 measures the intensity of the test light L1 emitted through the light guide portion 3a. The second measurement device 50 is a power meter that measures the intensity of the test light L1 in a state of being close to the screen 3. When the second optical fiber F2 is retracted from the axial line of the first optical fiber F1, the second measurement device 50 is disposed at a first position where the screen 3 is sandwiched between the second measurement device 50 and the end face F1a. The second measurement device 50 is movable between the first position and a second position away from the first position.

The control unit 4B is mainly different from the control unit 4A in that the control unit 4B is further electrically connected to the second measurement device 50 and a signal related to the light intensity of the test light L1 measured by the second measurement device 50 is input from the second measurement device 50.

The operation of the fusion splicer 1B is mainly different from that of the fusion splicer 1A in that step ST10 shown in FIG. 19 is performed before step ST11 in FIG. 11. In step ST10, the intensity of the test light L1 emitted from each of the plurality of cores CR of the first optical fiber F1 is measured for each core CR using the second measurement device 50. The details of step ST10 will be described with reference to FIG. 19. FIG. 19 is a flowchart showing an operation when the fusion splicer 1B measures the intensity of the test light L1 emitted from each of the plurality of cores CR of the first optical fiber F1 using the second measurement device 50.

First, in step ST101, the fusion splicer 1B arranges the first optical fiber F1, the screen 3, and the second measurement device 50 in this order in the Z-axis direction. In step ST102, the third driving unit 23 adjusts the position of the screen 3. To be more specific, the third unit 23 adjusts the position of the screen 3 so that the light guide portion 3a is aligned with any one of the plurality of cores CR or the marker MK of the first optical fiber F1 in the axial direction of the first optical fiber F1. Then, in step ST103, the light source 30 irradiates the resinous coating RS of the first optical fiber F1 with the test light L1. Then, in step ST104, the second measurement device 50 measures the intensity of the test light L1 emitted from one core CR and passing through the light guide portion 3a. The control unit 4B records the intensity of the test light L1 measured by the second measurement device 50.

Then, in step ST105, the control unit 4B determines whether or not the intensity of the test light L1 emitted from each of all the cores CR and the marker MK of the first optical fiber F1 has been measured. When there is an unmeasured core CR or marker MK among the plurality of cores CR and marker MK of the first optical fiber F1, the control unit 4B adjusts the position of the screen 3 so that the light guide portion 3a is aligned with either the unmeasured core CR or the unmeasured marker MK in the axial direction of the first optical fiber F1. Then, steps ST102 to 104 are performed again.

When the control unit 4B determines that the intensity of the test light L1 emitted from all the cores CR included in the first optical fiber F1 has been measured, the screen 3 and the second measurement device 50 are retracted in step ST106. Specifically, the second measurement device 50 moves to the second position described above. In step ST107, the second optical fiber F2 is returned to its original position. To be specific, the second optical fiber F2 is disposed such that the end face F2a faces the end face F1a.

Effects obtained by the fusion splicer 1B of the second embodiment having the above configuration will be described. In the fusion splicer 1B according to the second embodiment, the second measurement device 50 directly measures the intensity of the test light L1 emitted from each of the plurality of cores CR of the first optical fiber F1 for each core CR. Therefore, it is possible to confirm the light guiding state of the plurality of cores CR of the first optical fiber F1 more accurately.

When the light emission efficiency when light is emitted from the core CR of the second optical fiber F2 through the resinous coating RS is known, the sum of the intensities of the test light L1 measured by the second measurement device 50 corresponding to each of the plurality of cores CR of the first optical fiber F1 may be compared with the intensity of the leakage light L2. Thus, the amount of loss at the boundary between the first optical fiber F1 and the second optical fiber F2 can be calculated.

What is claimed is:

1. A fusion splicer for fusion-splicing a first end face that is an end face of a first optical fiber having a plurality of cores with a second end face that is an end face of a second optical fiber having a plurality of cores, the fusion splicer comprising:
    a first holding unit configured to hold the first optical fiber in a state where the first end face faces the second end face;
    a second holding unit configured to hold the second optical fiber in a state where the second end face faces the first end face;
    a screen disposed between the first end face and the second end face, the screen including a light guide portion through which only light emitted from one of the plurality of cores of the first optical fiber can pass, and a light shielding portion that shields light that does not pass through the light guide portion;
    a light source configured to cause test light to enter the first optical fiber;
    a first measurement device configured to measure an intensity of leakage light leaking from the second optical fiber out of the test light emitted from the first end face and incident on the second end face;
    discharge electrodes configured to heat the first end face and the second end face;
    a first driving unit configured to adjust a position of the first holding unit and a first angle that is a rotation angle about an axis of the first optical fiber;
    a second driving unit configured to adjust a position of the second holding unit and a second angle that is a rotation angle about an axis of the second optical fiber; and
    a third driving unit configured to adjust a position of the screen such that the light guide portion is aligned with one of the plurality of cores of the first optical fiber in an axial direction of the first optical fiber, and to retract the screen from a position between the first end face and the second end face.

2. The fusion splicer according to claim 1,
    wherein the first measurement device measures a first intensity that is an intensity of the leakage light in a state where the third driving unit retracts the screen from the position between the first end face and the second end face and where the first driving unit and the second driving unit adjust the first angle and the second angle so that the leakage light measured by the first measurement device has a maximum intensity, wherein the first measurement device measures, for each of the plurality of cores of the first optical fiber, each of core intensities that is an intensity of the leakage light in a state where a position of the screen is adjusted by the third driving unit such that the light guide portion is aligned with one of the plurality of cores of the first optical fiber in an axial direction of the first optical fiber, and wherein the first end face is fusion-spliced with the second end face when a ratio of a second intensity, which is a sum of the core intensities corresponding to the plurality of cores of the first optical fiber, to the first intensity is within a predetermined first range.

3. The fusion splicer according to claim 1, wherein the first measurement device measures, for each of the plurality of cores of the first optical fiber, each of core intensities that is an intensity of the leakage light in a state where a position of the screen is adjusted by the third driving unit such that the light guide portion is aligned with one of the plurality of cores of the first optical fiber in an axial direction of the first optical fiber, and wherein the first end face is fusion-spliced with the second end face when a ratio of a minimum core intensity to a maximum core intensity among the core intensities corresponding to the plurality of cores of the first optical fiber is within a predetermined second range.

4. The fusion splicer according to claim 1, wherein the first measurement device measures, for each of the plurality of cores of the first optical fiber, each of core intensities that is an intensity of the leakage light in a state where the position of the screen is adjusted by the third driving unit such that the light guide portion is aligned with one of the plurality of cores of the first optical fiber in an axial direction of the first optical fiber, wherein the first measurement device measures a third intensity that is an intensity of the leakage light in a state where the first end face is fusion-spliced with the second end face, wherein the fusion splicer further comprises a determination unit configured to determine a state of a fusion splicing between the first end face and the second end face, and wherein the determination unit determines that the state of fusion splicing between the first end face and the second end face is abnormal when a ratio of the third intensity to a second intensity that is a sum of the core intensities corresponding to the plurality of cores of the first optical fiber is outside a predetermined third range.

5. The fusion splicer according to claim 1, wherein each of the first optical fiber and the second optical fiber further includes a marker, and wherein the third driving unit further adjusts a position of the screen so that the light guide portion is aligned with the marker in the axial direction of the first optical fiber.

6. The fusion splicer according to claim 1, wherein the light guide portion is a through hole.

7. The fusion splicer according to claim 1, wherein the light guide portion is a condenser lens.

8. The fusion splicer according to claim 1, wherein the light shielding portion of the screen has a non-reflective coating.

9. The fusion splicer according to claim 1, further comprising:

a second measurement device configured to be movable between a first position sandwiching the screen between the first end face and a second position away from the first position and to measure an intensity of the test light emitted from the first end face through the light guide portion of the screen, wherein the second measurement device measures the intensity of the test light emitted from each of the plurality of cores of the first optical fiber through the light guide portion at the first position in a state where the second driving unit retracts the second optical fiber and the third driving unit adjusts a position of the screen so that the light guide portion is aligned with one of the plurality of cores of the first optical fiber in the axial direction of the first optical fiber, and after that measurement, the second measurement device moves to the second position and the second driving unit returns the second optical fiber to a position facing the first optical fiber.

10. A fusion splicing method for fusion-splicing a first end face that is an end face of a first optical fiber having a plurality of cores with a second end face that is an end face of a second optical fiber having a plurality of cores, the fusion splicing method comprising:

causing the first end face and the second end face to face each other;

aligning a central axis of the first optical fiber and a central axis of the second optical fiber with each other;

adjusting a first angle that is a rotation angle about the central axis of the first optical fiber and a second angle that is a rotation angle about the central axis of the second optical fiber;

incidence of test light into the first optical fiber;

performing, for each of the plurality of cores of the first optical fiber, measuring an intensity of leakage light leaking from the second optical fiber in a state where the test light other than the test light emitted from one core of the plurality of cores of the first optical fiber among the test light emitted from the first end face is shielded; and determining whether to fusion-splice the first end face with the second end face based on the intensity of the leakage light corresponding to each of the plurality of cores of the first optical fiber.

11. The fusion splicing method according to claim 10, wherein in the measuring, a screen is disposed between the first end face and the second end face, and the screen includes a light guide portion through which only light emitted from one of the plurality of cores of the first optical fiber can pass and a light shielding portion that shields light that does not pass through the light guide portion.

12. The fusion splicing method according to claim 11, wherein the measuring further includes:

measuring a first intensity that is an intensity of the leakage light in a state where the first angle and the second angle are adjusted so that the leakage light to be measured has a maximum intensity; and measuring, for each of the plurality of cores of the first optical fiber, each of core intensities that is an intensity of the leakage light in a state where a position of the screen is adjusted such that the light guide portion is aligned with one of the plurality of cores of the first optical fiber in an axial direction of the first optical fiber, wherein it is determined in the determining that the first end face is to be fusion-spliced to the second end face when a ratio of a second intensity, which is a sum of the core intensities corresponding to the plurality of cores of the first optical fiber, to the first intensity is within a predetermined first range.

13. The fusion splicing method according to claim 11, wherein the measuring further includes:
measuring, for each of the plurality of cores of the first optical fiber, each of core intensities that is an intensity of the leakage light in a state where a position of the screen is adjusted such that the light guide portion is aligned with one of the plurality of cores of the first optical fiber in an axial direction of the first optical fiber,
wherein it is determined in the determining that the first end face is to be fusion-spliced to the second end face when a ratio of a minimum core intensity to a maximum core intensity among the core intensities corresponding to the plurality of cores of the first optical fiber is within a predetermined second range.

14. The fusion splicing method according to claim 11, wherein the measuring further includes:
measuring, for each of the plurality of cores of the first optical fiber, each of core intensities that is an intensity of the leakage light in a state where a position of the screen is adjusted such that the light guide portion is aligned with one of the plurality of cores of the first optical fiber in an axial direction of the first optical fiber,
wherein the fusion splicing method further comprises:
measuring a third intensity that is an intensity of the leakage light in a state where the first end face is fusion-spliced with the second end face; and
determining a state of a fusion splicing between the first end face and the second end face, and
wherein it is determined in the determining that the state of fusion splicing between the first end face and the second end face is abnormal when a ratio of the third intensity to a second intensity that is a sum of the core intensities corresponding to the plurality of cores of the first optical fiber is outside a predetermined third range.

15. The fusion splicing method according to claim 11, wherein the light guide portion is a through hole.

16. The fusion splicing method according to claim 11, wherein the light guide portion is a condenser lens.

17. The fusion splicing method according to claim 11, wherein the light shielding portion of the screen has a non-reflective coating.

* * * * *